(12) United States Patent
Tsukahara

(10) Patent No.: US 9,985,697 B2
(45) Date of Patent: May 29, 2018

(54) CIRCUIT DEVICE, ELECTRONIC DEVICE, AND DRIVE METHOD FOR RESONANT CIRCUIT

(71) Applicant: SEIKO EPSON CORPORATION, Tokyo (JP)

(72) Inventor: Norikazu Tsukahara, Minamiminowa-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 15/255,620

(22) Filed: Sep. 2, 2016

(65) Prior Publication Data

US 2017/0077822 A1    Mar. 16, 2017

(30) Foreign Application Priority Data

Sep. 11, 2015  (JP) .................................. 2015-179592

(51) Int. Cl.
| | |
|---|---|
| *H04B 5/00* | (2006.01) |
| *H02M 1/36* | (2007.01) |
| *H02M 3/335* | (2006.01) |
| *H02M 1/00* | (2006.01) |

(52) U.S. Cl.
CPC ............. *H04B 5/0075* (2013.01); *H02M 1/36* (2013.01); *H02M 3/335* (2013.01); *H02M 2001/0058* (2013.01); *Y02B 70/1433* (2013.01); *Y02B 70/1491* (2013.01)

(58) Field of Classification Search
CPC ........ H02M 1/36; H02M 3/335; H02M 3/315; H02M 3/33569; H02M 3/33507; H02M 2007/4815; H02M 2007/4818; H02M 2001/0058; Y02B 70/1433; Y02B 70/1491
USPC ..... 363/20, 21.01, 21.02, 21.03, 95, 97, 131
See application file for complete search history.

(56) References Cited

U.S. PATENT DOCUMENTS

| | | | | |
|---|---|---|---|---|
| 5,304,917 | A | * | 4/1994 | Somerville ........... H02J 7/0081 320/148 |
| 5,615,093 | A | * | 3/1997 | Nalbant .............. H02M 3/3376 315/307 |
| 6,362,575 | B1 | * | 3/2002 | Chang ................ H05B 41/2827 315/209 R |

(Continued)

FOREIGN PATENT DOCUMENTS

| | | |
|---|---|---|
| JP | H07-143188 A | 6/1995 |
| JP | H10-52035 A | 2/1998 |

(Continued)

*Primary Examiner* — Adolf Berhane
(74) *Attorney, Agent, or Firm* — Oliff PLC

(57) ABSTRACT

A circuit device includes a driver that performs drive control of a resonant circuit and a signal output unit having an input node $N_{AIN}$ to which a resonance signal (AIN) from the resonant circuit is input, an output node $N_{AOUT}$ that outputs an output signal (AOUT) that is based on the resonance signal and a switch element that is provided between the input node $N_{AIN}$ and the output node $N_{AOUT}$, the driver controlling at least one of a first drive current in an ON period of the switch element and a second drive current in an OFF period of the switch element.

13 Claims, 22 Drawing Sheets

(56) References Cited

U.S. PATENT DOCUMENTS

| | | | |
|---|---|---|---|
| 9,735,676 B2* | 8/2017 | Madsen | H02M 3/158 |
| 2009/0021219 A1 | 1/2009 | Yoda et al. | |
| 2014/0368167 A1* | 12/2014 | Okura | H02J 5/005 |
| | | | 320/109 |
| 2015/0155787 A1* | 6/2015 | Chen | H02M 3/33507 |
| | | | 363/21.15 |
| 2015/0180411 A1* | 6/2015 | Gao | H03B 5/1234 |
| | | | 331/109 |
| 2015/0194896 A1* | 7/2015 | Stuler | H02M 3/33523 |
| | | | 363/21.02 |
| 2015/0303806 A1* | 10/2015 | Madsen | H02M 7/5383 |
| | | | 323/271 |
| 2017/0054379 A1* | 2/2017 | Nishikawa | H02M 1/088 |

FOREIGN PATENT DOCUMENTS

| | | |
|---|---|---|
| JP | 2007-129298 A | 5/2007 |
| JP | 2011-155836 A | 8/2011 |

* cited by examiner

CIRCUIT DEVICE, ELECTRONIC DEVICE, AND DRIVE METHOD FOR RESONANT CIRCUIT

BACKGROUND

1. Technical Field

The present invention relates to a circuit device, an electronic device, and the like.

2. Related Art

Heretofore, circuit devices that perform various processing using signals from a resonant circuit are known. For example, JP-A-2011-155836 discloses techniques relating to controlling supply of power in the power receiving apparatus that charges a battery using a contactless power transmission system, one technique of which involves performing information communication between the power receiving side (power receiving apparatus) and the power transmitting side using signals from the resonant circuit.

Also, a typical ASK (Amplitude Shift Keying) modulation method is disclosed in FIGS. 4(a) to (c) of JP-A-7-143188. Transmission data that is to undergo ASK modulation is shown in FIG. 4(a), a carrier wave, which is the output waveform of the resonant circuit, is shown in FIG. 4(b), and the transmission waveform of the ASK modulated signal is shown in FIG. 4(c).

In the above technology, ASK modulation is realized by switching the carrier wave on and off based on the transmission data, as shown in FIGS. 4(a) to (c) of JP-A-7-143188.

However, with the above technology, since the carrier wave is generated by continuously operating the oscillation circuit (resonant circuit), as shown in FIG. 4(b), the power consumption of the oscillation circuit cannot be reduced, and this stands as an impediment to reducing power consumption.

SUMMARY

An advantage of some aspects of the present invention is to provide a circuit device, an electronic device, and the like that are able to realize drive control of a resonant circuit with low power consumption.

One aspect of the invention relates to a circuit device including a driver that performs drive control of a resonant circuit, and a signal output unit having an input node to which a resonance signal from the resonant circuit is input, an output node that outputs an output signal that is based on the resonance signal, and a switch element provided between the input node and the output node, the driver controlling at least one of a first drive current in an ON period of the switch element and a second drive current in an OFF period of the switch element.

In one aspect of the present invention, a circuit device that outputs an output signal that is based on a resonance signal via a switch element controls at least one of the drive current in the ON period and the drive current in the OFF period of the switch element. It thereby becomes possible to perform efficient current control according to the state of the switch element.

Also, in one aspect of the present invention, the signal output unit may be a modulation unit that modulates the resonance signal of the resonant circuit based on transmission data, and outputs a modulated signal as the output signal, the ON period may be a period in which the transmission data is at a first logic level, and the OFF period may be a period in which the transmission data is at a second logic level.

It thereby becomes possible to output a modulated signal as the output signal, and to perform current control that depends on the logic level of transmission data.

Also, in one aspect of the present invention, the driver may control the drive current of the resonant circuit, such that a current value of the second drive current is small compared with the current value of the first drive current.

The current value in the OFF period can thereby be relatively decreased, enabling a reduction in power consumption and the like.

Also, in one aspect of the present invention, the driver may, in a start period of the ON period, perform control that increases a current value of the first drive current, compared with a period of the ON period other than the start period.

The current value can thereby be relatively increased in the start period of the ON period, enabling the amplitude of the resonance signal in the ON period to be increased in a short time and the like.

Also, in one aspect of the present invention, the driver may, in a start period of the OFF period, perform control that decreases a current value of the second drive current, compared with a period of the OFF period other than the start period.

It thereby becomes possible to further reduce the power consumption in the OFF period and the like.

Also, in one aspect of the present invention, the driver may, in the start period of the OFF period, perform control that turns off the second drive current.

It thereby becomes possible to further reduce the power consumption in the OFF period and the like.

Also, in one aspect of the present invention, the driver may, in the ON period, output a plurality of first current pulses as the first drive current, and may, in the OFF period, output a plurality of second current pulses as the second drive current, and the driver may control a current value of at least one of the first current pulse and the second current pulse.

The current pulse can thereby be used as a drive current, enabling a reduction in power consumption and the like compared with the case where a current that is not intermittent (that is not a pulse) is used.

Also, in one aspect of the present invention, the driver may include a current source, and a transistor that is supplied with a current from the current source and controlled by a drive timing signal, and the driver may output the first current pulse and the second current pulse, using the current source and the transistor.

It thereby becomes possible to output a current pulse using a current source and a transistor.

Also, in one aspect of the present invention, the circuit device may further include a storage that stores a setting value of the current value.

It thereby becomes possible to control the current value of the drive current, based on the setting value stored in the storage.

Also, in one aspect of the present invention, the circuit device may further include a reference voltage generator, the resonant circuit may have a primary coil and a secondary coil, the reference voltage generator may output a reference voltage of a primary side resonance signal to one end of the primary coil, and the driver may output the drive current to the other end of the primary coil.

It thereby becomes possible to drive the resonant circuit, by using a circuit having a configuration that includes a primary coil and a secondary coil as a resonant circuit, and outputting a reference voltage and a drive current to respective ends of the primary coil of this resonant circuit.

Also, in one aspect of the present invention, the circuit device may further include a rectifier circuit that generates a rectification signal for a power supply voltage of the switch element from the resonance signal, which is a signal obtained by boosting the primary side resonance signal, using the primary coil and the secondary coil of the resonant circuit.

It thereby becomes possible to control the switch element using a rectifier circuit.

Also, in one aspect of the present invention, the switch element may operates based on a switching signal from a controller and a signal obtained by level shifting the rectification signal from the rectifier circuit to a signal that is based on a low potential side power supply voltage operates based on a switching signal from a controller and a signal obtained by level shifting the rectification signal from the rectifier circuit to a signal that is based on a low potential side power supply voltage.

It thereby becomes possible to operate the switch element by performing level shifting based on signals from the rectifier circuit.

Also, another aspect of the present invention relates to an electronic device including the above circuit device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described. Note that the embodiments that are described below are not intended to unduly limit the content of the invention as defined in the claims. Also, not all of the constituent elements that are described in the embodiments are essential to the invention. For example, the intermittent current control and startup control that are described below may not be essential to the invention.

1. Exemplary Configuration of Circuit Device

Figure 1:
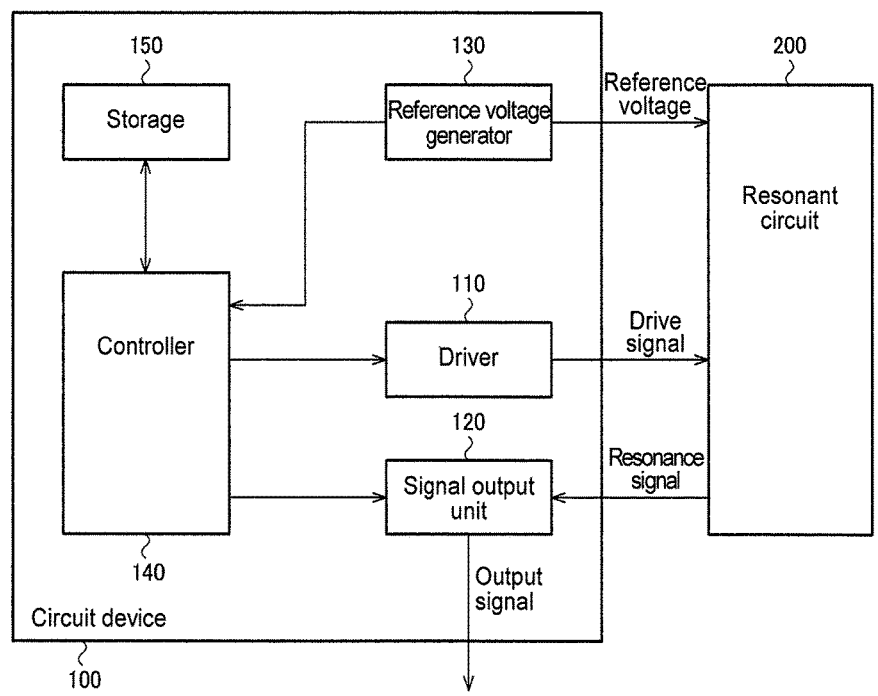
FIG. 1 shows an exemplary configuration of a circuit device.

An exemplary configuration of a circuit device 100 according to this embodiment is shown in FIG. 1. The circuit device 100 includes a driver 110, a signal output unit 120, a reference voltage generator 130, a controller 140, and a storage 150. The circuit device 100 is, however, not limited to the configuration in FIG. 1, and various modifications are possible, such as omitting some of these constituent elements or adding other constituent elements. Also, the point that various modifications are possible, such as omitting some of the constituent elements shown in the diagram or adding other constituent elements, similarly applied to the other diagrams that will be described in this specification.

The driver 110 performs drive control of a resonant circuit 200. Specifically, the driver 110 outputs a drive signal that drives the resonant circuit 200 to the resonant circuit 200. The drive signal referred to here may be a drive current. Also, the drive signal may be an intermittent signal that becomes active (high level) at a given timing and becomes inactive (low level) at a given timing, that is, a drive pulse signal, as will be discussed later using H3 in FIG. 17 and I3 in FIG. 18. Also, the drive signal may be a current pulse, which is an intermittent drive current.

Figure 2:
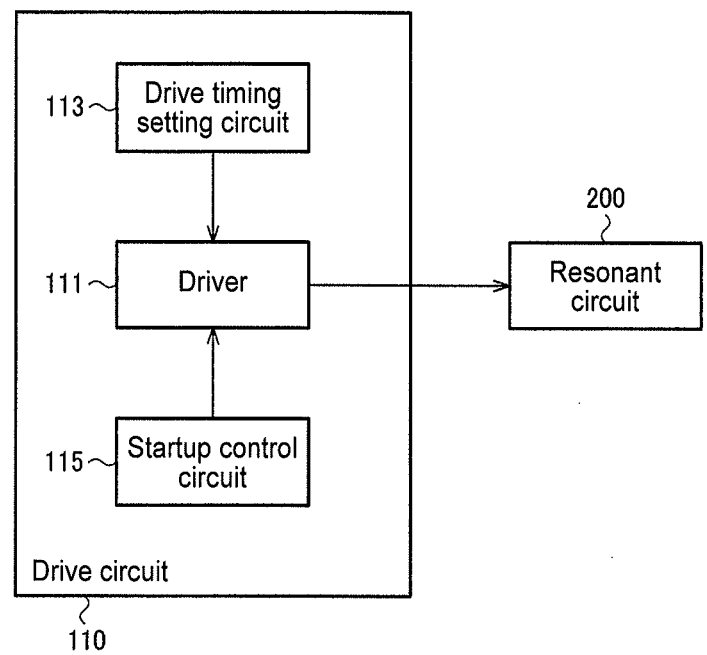
FIG. 2 shows an exemplary configuration of a driver.

An exemplary configuration of the driver 110 is shown in FIG. 2. The driver 110 may also include a drive circuit 111, a drive timing setting circuit 113, and a startup control circuit 115. Note that a specific circuit configuration of each unit of the driver 110 will be discussed later using FIG. 16 and the like.

The drive circuit 111 is a circuit that outputs a drive signal to the resonant circuit 200. The drive timing setting circuit 113 is a circuit that sets the drive timing. The drive timing referred to here indicates the output timing of the drive signal. That is, the drive circuit 111 outputs a drive signal to the resonant circuit 200 at a timing (drive timing) set by the drive timing setting circuit 113.

It is possible to drive the resonant circuit 200 (in a narrow sense, to maintain a resonance state) using the drive circuit 111 and the drive timing setting circuit 113. However, in this embodiment, control for startup may be performed at the time of starting up the resonant circuit 200 (at the time of starting resonance; at the start time). The startup control circuit 115 is a circuit that operates when starting up the resonant circuit 200. Specifically, the startup control circuit 115 performs control for causing the drive circuit 111 to output a drive signal, in the case where a startup signal (enable signal EN) is input from the controller 140.

The signal output unit 120 outputs an output signal that is based on the signal (resonance signal) from the resonant circuit 200. The output signal referred to here is data obtained by using the resonance signal as a carrier wave, for example, and ASK modulating the carrier wave using transmission data (data signal DATA), but is not limited thereto. As disclosed in JP-A-2011-155836, for example, the resonance signal may be output as an output signal in order to perform power transmission.

The reference voltage generator 130 generates a reference voltage, and supplies the reference voltage to the resonant circuit 200. The reference voltage referred to here is an analog ground AGND (analog reference voltage) that determines a reference in resonance (center voltage of resonance), for example. Also, the generated reference voltage may be not only supplied to the resonant circuit 200, but may also be utilized as a power supply voltage (VDD) of the units of the circuit device 100.

Figure 3:
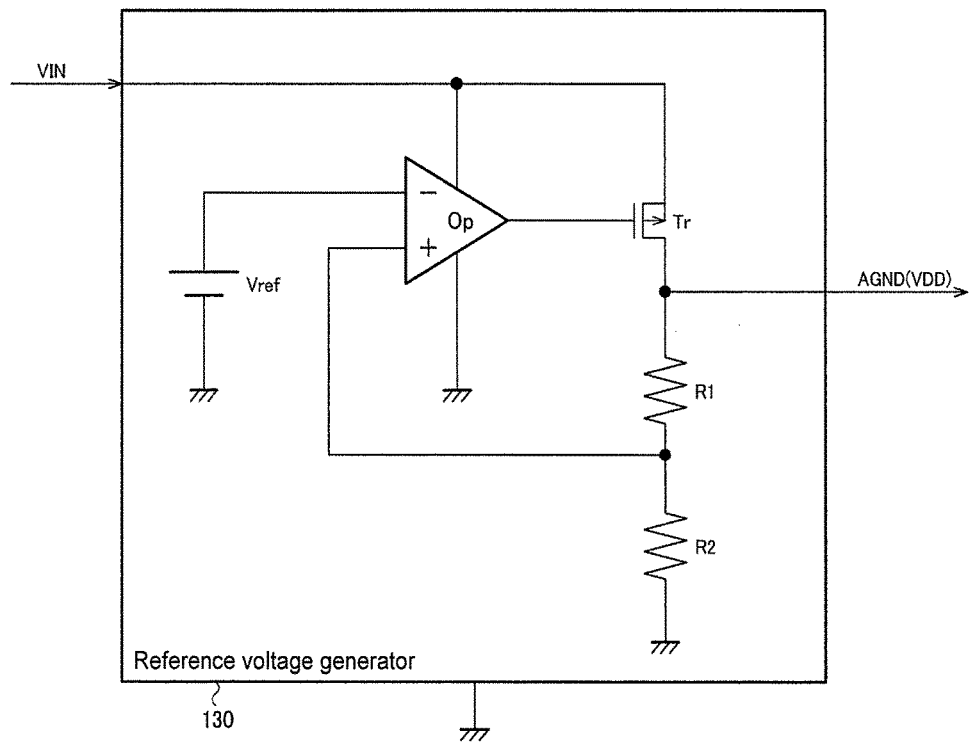
FIG. 3 shows an exemplary circuit configuration of a reference voltage generator.

An exemplary circuit configuration of the reference voltage generator 130 is shown in FIG. 3. As shown in FIG. 3, it is possible to realize the reference voltage generator 130 using a typical linear regulator. The reference voltage generator 130 includes an output transistor Tr, a operational amplifier Op, and two resistors R1 and R2 for voltage division.

An input voltage VIN is supplied to a source of the P-type output transistor Tr, and the output of the operational amplifier Op is supplied to a gate thereof. Also, the analog ground AGND is output from a drain thereof. The resistors R1 and R2 are provided in series between the drain (output terminal of the reference voltage generator 130) of the output transistor Tr and the ground (low potential side power supply).

A reference voltage Vref is input to an inverting input terminal of the operational amplifier Op, and a signal obtained by AGND being voltage divided by R1 and R2 is input to a non-inverting input terminal thereof. This enables the operational amplifier Op to compare a feedback voltage that is based on AGND with the reference voltage Vref and perform adjustment such that the difference is zero, making it possible to maintain the output (AGND) at a constant potential, even if AGND is tending to fluctuate due to fluctuation in input or load.

The controller 140 controls each unit of the circuit device 100. For example, in the case of ASK modulation being performed by the signal output unit 120, the controller 140 may perform acquisition (e.g., generation) of the data signal DATA and output of the data signal DATA to the signal output unit 120. Also, when starting resonance, the controller 140 may transmit the startup signal (enable signal EN) that instructs startup to the driver 110 (in a narrow sense, the startup control circuit 115). Also, the controller 140 may perform control for monitoring the resonance state of the resonant circuit 200, in order to determine whether to output the enable signal EN.

The functions of the controller 140 can be realized by programs, hardware such as various types of processors or an ASIC (gate array, etc.), or the like. For example, the controller 140 may be realized by a DSP (digital signal processor).

Figure 4:
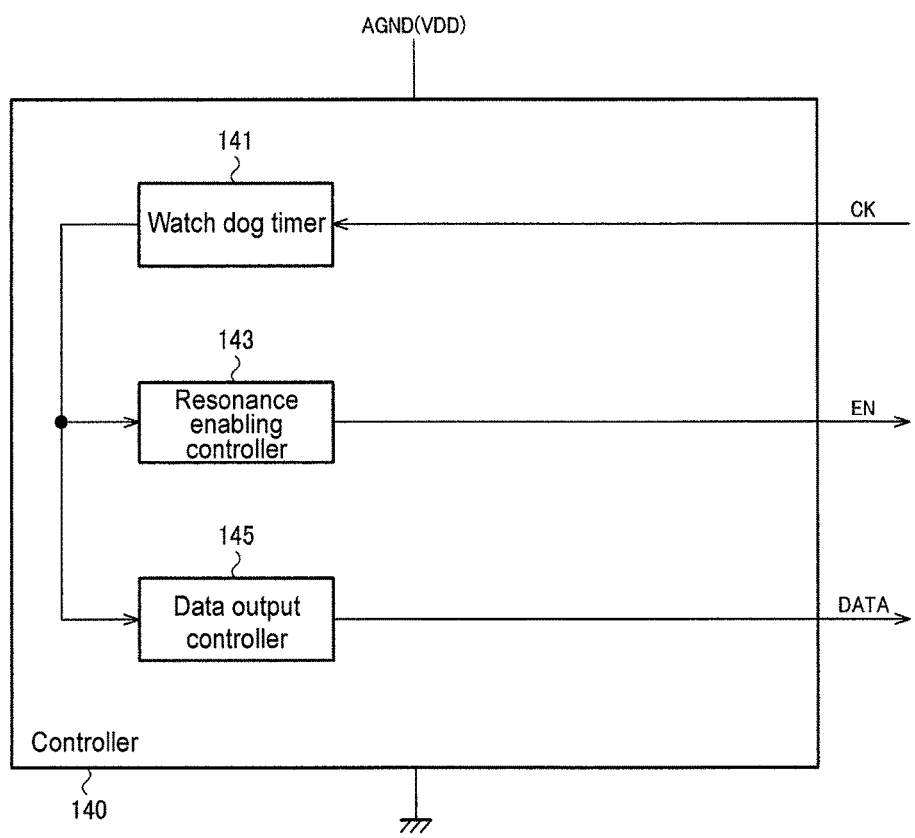
FIG. 4 shows an exemplary configuration of a controller.

An exemplary configuration of the controller 140 is shown in FIG. 4. The controller 140 may also include a watch dog timer 141, a resonance enabling controller 143, and a data output controller 145.

The watch dog timer 141 monitors the resonance state by detecting a clock signal CK. The clock signal CK will be discussed in detail later. The resonance enabling controller 143, in the case of starting resonance, outputs the enable signal EN. For example, the enable signal EN need only be output, in the case where it is determined by the watch dog timer 141 that resonance has stopped (has timed out). The data output controller 145 outputs the data signal DATA to the signal output unit 120 and the like. Note that in order to stabilize startup at the time of starting resonance, the data output controller 145 may perform output control for startup, as will be discussed in detail later.

The storage 150 stores various information that is utilized by the circuit device 100. The storage 150 may store information that is used in control of the driver 110, for example, and may, as an example, store setting values of the signal value (current value of current pulse) of the drive signal. The storage 150 may be realize by a volatile memory such as a RAM, but is preferably realized by a nonvolatile memory such as a ROM or a flash memory in the case where storage of control information is envisaged as mentioned above.

Figure 5:
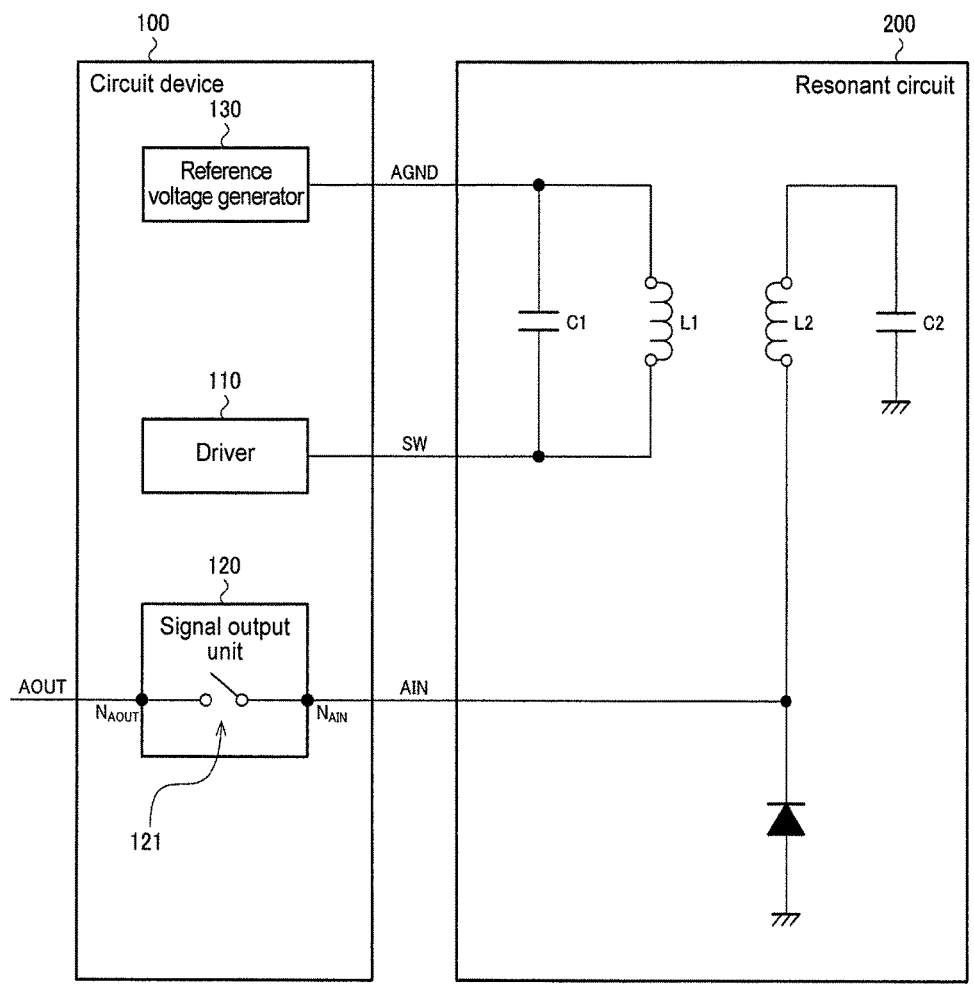
FIG. 5 shows an exemplary configuration of a resonant circuit.

FIG. 5 shows an exemplary configuration of the resonant circuit 200 that is driven by the driver 110. As shown in FIG. 5, the resonant circuit 200 includes a capacitor C1, an LC oscillation circuit having a primary coil (inductor) L1, and a secondary coil (secondary side inductor) L2. A transformer is constituted by the primary coil L1 of the LC oscillation circuit and the secondary coil L2. Also, a capacitor C2 is provided between one end of the secondary coil L2 and the low potential side power supply (ground).

In the exemplary resonant circuit in FIG. 5, the reference voltage generator 130 supplies the reference voltage (AGND) to one end of the primary coil L1, and the driver 110 supplies the drive signal to the other end of the primary coil L1. The LC resonant circuit thereby resonates centered on AGND, and a primary side resonance signal SW is output. Also, due to electromagnetic induction between the primary coil L1 and the secondary coil L2, a resonance signal AIN resulting from the amplitude being converted according to a transformation ratio (in a narrow sense, a turn ratio) is produced in the secondary coil L2, and the resonance signal AIN is fed back to the signal output unit 120. The signal output unit 120 performs conversion if necessary on the resonance signal AIN, and outputs the conversion result as an output signal AOUT. As mentioned above, in the case of performing ASK modulation in the signal output unit 120, the result of modulating the resonance signal AIN as a carrier wave using the data signal DATA need only be taken as the output signal AOUT. Also, depending on the use mode of the circuit device, a sine wave (resonance signal AIN) that is input may be directly output as the output signal AOUT.

In the specification that follows, description will be given taking the case where the resonant circuit 200 has the configuration in FIG. 5 as an example, but the configuration of the resonant circuit 200 is not limited to FIG. 5.

Figure 6:
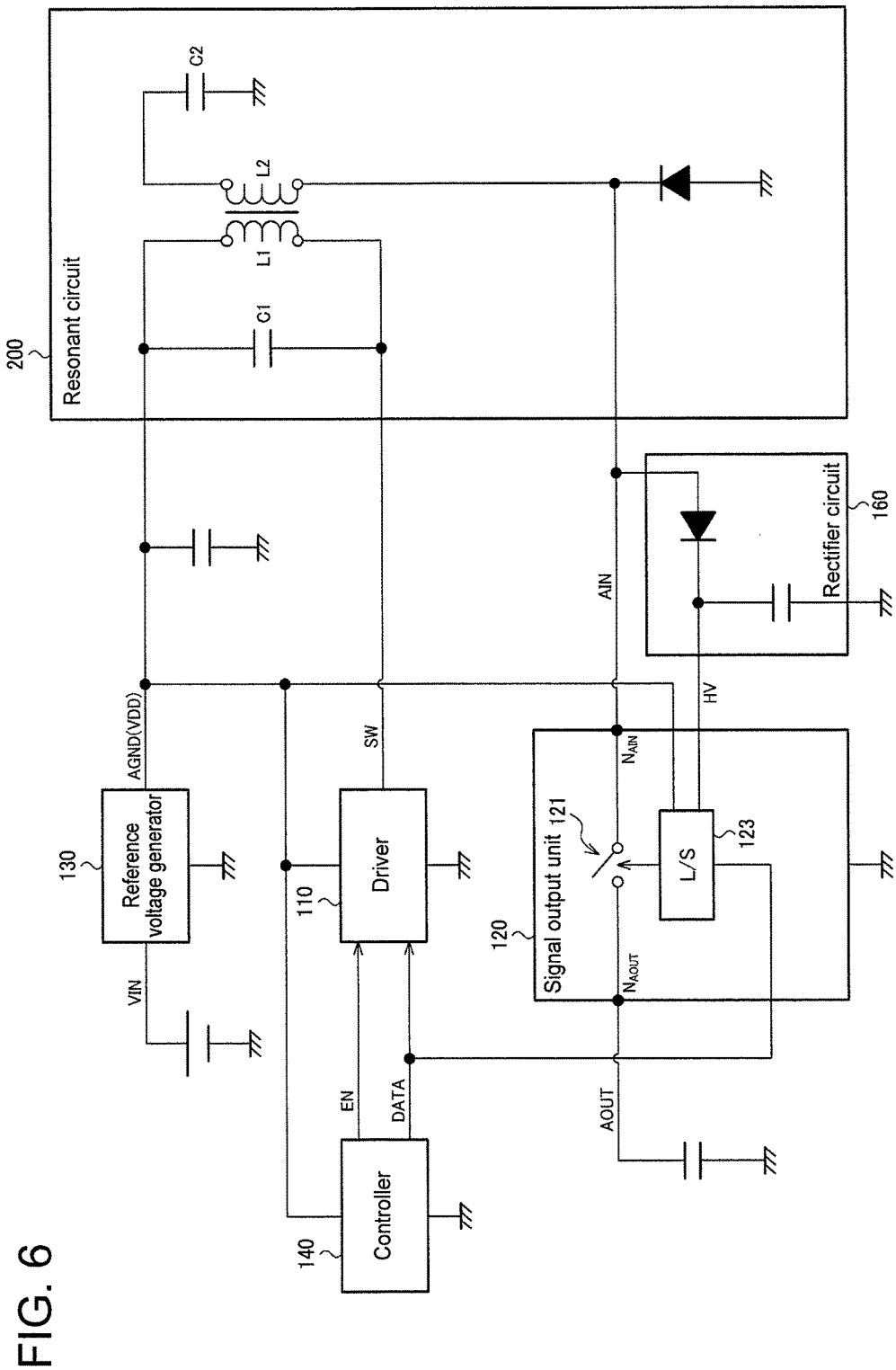
FIG. 6 shows exemplary signal input/output between the resonant circuit and respective units of the circuit device.

FIG. 6 shows an exemplary relationship of signal input/output between the abovementioned units. The reference voltage generator 130 generates a reference voltage (analog ground AGND) and outputs the reference voltage to the resonant circuit 200 as a reference for the primary side resonance signal SW, as well as to the driver 110, the signal output unit 120 and the controller 140 as a power supply voltage (VDD).

The driver 110 drives the resonant circuit 200 by outputting a drive signal to the resonant circuit 200, and causes the primary side resonance signal SW to be produced at one end of the primary coil. The signal output unit 120 acquires the resonance signal AIN of the resonant circuit 200, and outputs the resonance signal AIN as the output signal AOUT via a switch element 121. Note that level shifting using the output of a rectifier circuit 160 and the data signal DATA may be performed as a power supply voltage that controls the switch element 121, as will be discussed later.

The controller 140 outputs the enable signal EN, which is used for starting the resonant circuit 200, and the data signal DATA to the driver 110. The driver 110 uses the data signal DATA in controlling the drive timing.

Hereinafter, control for starting resonance will be described, after describing a technique for control that takes power saving into consideration, or specifically, techniques for current control that is performed by the driver 110. Finally, an exemplary electronic device including the circuit device 100 will be described.

2. Techniques for Current Control in Driver

As mentioned above, the driver 110 drives (resonates) the resonant circuit 200 by supplying a drive signal. Thus, it becomes possible to reduce the power consumption of the circuit device 100 by efficiently supplying the drive signal. Specifically, power saving is possible by decreasing the signal value (current value) of the drive signal, according to the situation. Also, since there is a period in which the current value can greatly decreased (in a narrow sense, to 0) if the drive is performed intermittently, power consumption as a total can be reduced. Hereinafter, the respective techniques will be described in detail.

2.1 Control of Current Value Coupled to Switch Element (Data Signal)

Figure 7:
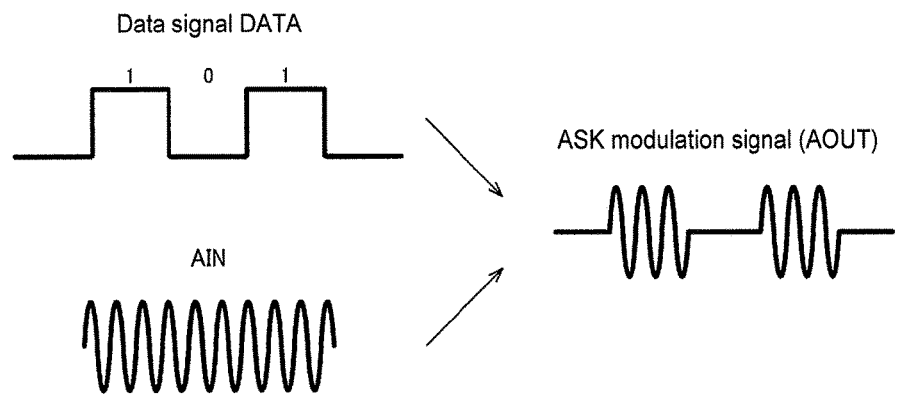
FIG. 7 is a diagram illustrating ASK modulation.

As mentioned above, ASK modulation is a known modulation method. An exemplary waveform in the case of using ASK is shown in FIG. 7. As shown in FIG. 7, in the case where a data signal DATA of 0 or 1 and a resonance signal AIN, which is sine wave, are acquired, the signal output unit 120 generates an ASK modulated waveform, for example, and outputs the ASK modulated waveform as the output signal AOUT. The signal output unit 120 can be realized by a configuration having a switch element 121 that only turns on when the data signal is 1, for example.

As is evident from FIG. 7, the amplitude of the output signal AOUT also becomes 0 at the timing at which the data signal DATA becomes 0. In other words, in the case where the data signal DATA is 0, the magnitude of the amplitude of the carrier wave (resonance signal AIN) does not affect the output signal AOUT. Even in an extreme case where the resonant circuit 200 is not driven and there is no resonance signal (where the amplitude of AIN is 0), no issues arise in the period in which the data signal DATA is 0. In contrast, in the period in which the data signal DATA is 1, the amplitude of the output signal AOUT must be sufficiently large to be distinguishable from the amplitude in the period in which the data signal DATA is 0, and thus the amplitude of the resonance signal AIN needs to be of sufficient magnitude. Naturally, maintaining the resonance is also important, and thus control that results in no resonance signal AIN is not preferable even when the data signal is 0, as will be discussed later.

In other words, the conditions to be satisfied by the resonance signal AIN, particularly, the conditions of the amplitude value, are decided according to the value of the data signal DATA. Since the amplitude value of the resonance signal AIN is dependent on the signal value of the drive signal, specifically, the current value of the drive current, it becomes possible to efficiently drive the resonant circuit 200 by performing current control in the driver 110 according to the data signal DATA.

Note that although in the example described above the signal output unit 120 is a modulation unit and, in particular, performs ASK modulation, the signal output unit 120 is not limited thereto. For example, the signal output unit 120 may have a configuration that performs ON/OFF control of the output of the resonance signal AIN, and does not perform modulation. Even in this case, there is considerable merit in controlling the drive current, since the resonance signal AIN does not need to be supplied to the signal output unit 120 in the output OFF period.

That is, the circuit device 100 according to this embodiment, as shown in FIG. 1 or FIG. 5, includes the driver 110 that performs drive control of the resonant circuit 200 and the signal output unit 120 having an input node $N_{AIN}$ to which the resonance signal AIN from the resonant circuit 200 is input, an output node $N_{OUT}$ of the output signal AOUT that is based on the resonance signal AIN and the switch element 121 that is provided between the input node $N_{AIN}$ and the output node $N_{OUT}$. The driver 110 controls at least one of a first drive current in the ON period of the switch element 121 and a second drive current in the OFF period of the switch element 121.

Here, the ON period of the switch element 121 indicates the period in which the nodes are connected by the switch element 121, and specifically indicates the period in which a signal based on the resonance signal AIN is output as the output signal AOUT. Similarly, the OFF period indicates the period in which the connection between the nodes by the switch element 121 is disconnected, and specifically indicates the period in which a signal based on the resonance signal AIN is not output as the output signal AOUT.

Also, control of the drive current is, in a narrow sense, control of the current value, but is not limited thereto. As mentioned above, since efficiently driving the resonant circuit 200 merely requires controlling the magnitude of the power that is supplied, the amplitude of the resonance signal need only be controlled. Thus, in the case of supplying the drive current as a current pulse, for example, control of the pulse width (duty ratio) may be performed as control of the drive current. The pulse width is controllable by widely known PWM (pulse width modulation) or the like.

Since this enables the drive current to be controlled, based on whether the switch element 121 is in the ON period or the OFF period, that is, whether the resonance signal AIN is used in outputting the output signal AOUT, it becomes possible to efficiently control the circuit device 100. Specifically, in the period in which the resonance signal AIN is utilized in outputting the output signal AOUT, it becomes possible to improve the accuracy of the output signal AOUT (e.g., to suppress data error in the ASK modulation) by relatively increasing the drive current, and in the period in which the resonance signal AIN is not utilized in outputting the output signal AOUT, it becomes possible to realize power saving by relatively decreasing the drive current.

Specifically, the signal output unit 120 may be a modulation unit that modulates the resonance signal AIN of the resonant circuit 200 based on the transmission data DATA, and outputs the modulated signal as the output signal AOUT. In this case, the ON period is the period in which the transmission data DATA is at a first logic level, and the OFF period is a period in which the transmission data DATA is at a second logic level.

This makes it possible to realize a circuit device 100 that efficiently outputs ASK modulated signals.

Note that although FIG. 7 was described with regard to binary ASK modulation, the signal output unit (modulation unit) 120 may perform other ASK modulations such as quaternary modulation. For example, the amplitude value of the output signal is controlled over four stages, and each amplitude value need only be corresponded to 2-bit data signals "11", "10", "01" and "00". 0 is also typically utilized as the smallest amplitude value among the ASK modulated signals in this case. In other words, in quaternary or higher order ASK modulation, it is also not an issue if the amplitude value of the carrier wave (resonance signal AIN) is small, in the case where the transmission data DATA is a given logic level (e.g., "00"). Thus, it is arguably useful to control the drive current by distinguishing between the case where the data signal DATA is at the given logic level and the case where the data signal DATA is at another logic level (e.g., "11", "10", "01"). In this case, however, it is necessary to provide a configuration for enabling the amplitude value to be changed (to be set over three stages respectively corresponding to "11", "10" and "01" in the case of quaternary modulation) even during the ON period of the switch element 121.

Alternatively, the circuit device 100 according to this embodiment may include the driver 110 that performs drive control of the resonant circuit 200, and a modulation unit (signal output unit 120) that modulates the resonance signal AIN of the resonant circuit 200 using the data signal DATA, and the driver 110 may control at least one of the first drive current in the period in which the data signal DATA is at the first logic level and the second drive current in the period in which the data signal DATA is at the second logic level.

Hereinafter, a specific technique for controlling the drive current will be described. First, in the case where the ON period and OFF period of the switch element 121 are broadly compared, the amplitude of the resonance signal AIN in the ON period needs to be sufficiently large to output the output signal AOUT as mentioned above, whereas the amplitude of the resonance signal AIN in the OFF period does not need to be so large.

Therefore, the driver 110 controls the drive current of the resonant circuit 200 such that the current value of the second drive current decreases compared with the current value of the first drive current.

Figure 8:
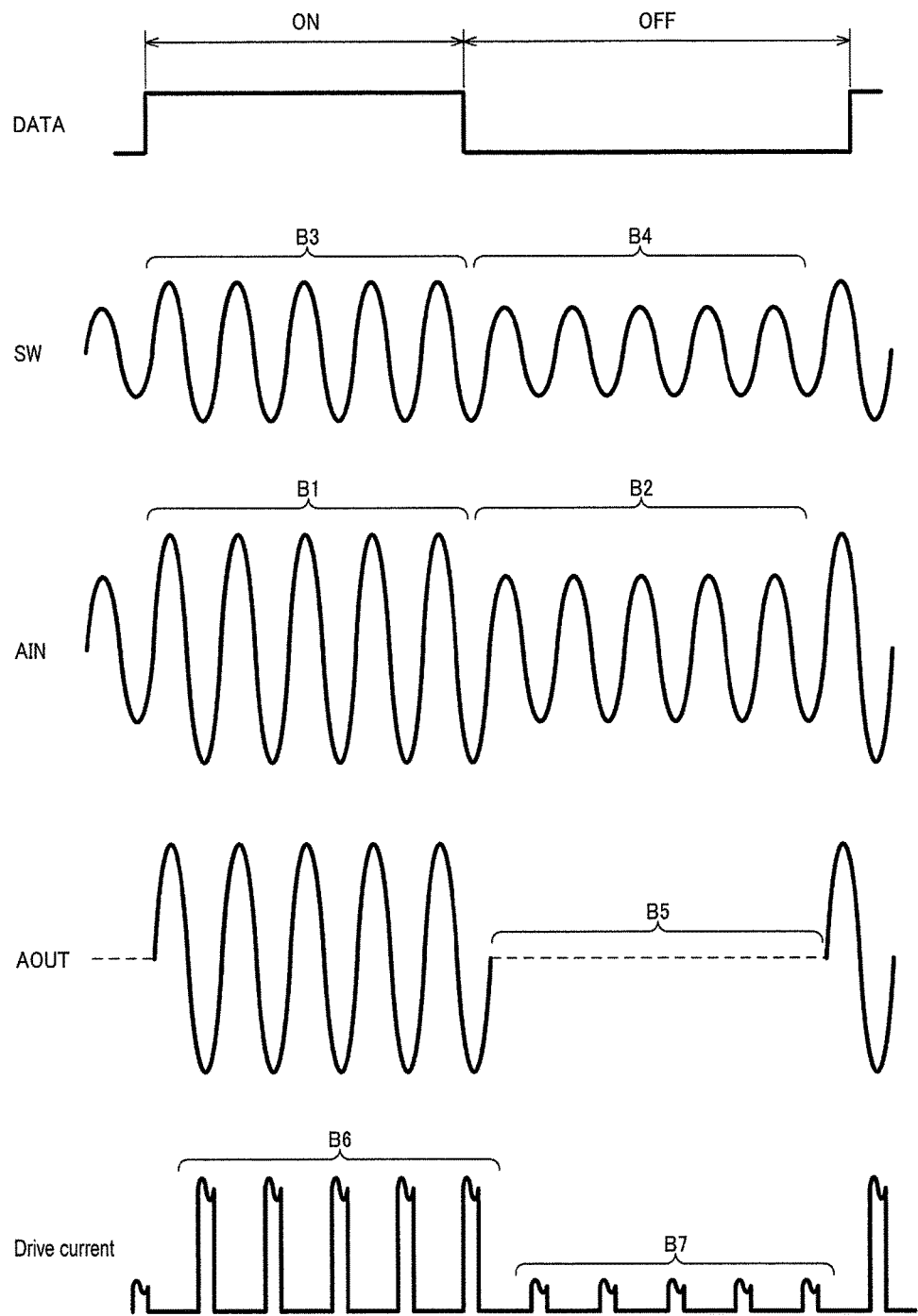
FIG. 8 shows exemplary control of a drive current in an ON period and an OFF period.

FIG. 8 shows time change waveforms of the respective signals in this case. As shown in DATA and AIN of FIG. 8, in the ON period in which the data signal DATA is 1, the amplitude of the resonance signal AIN is large (B1), and in the OFF period in which the data signal DATA is 0, the amplitude of the resonance signal AIN is relatively small (B2). Given that the amplitude of the primary side resonance signal SW and the amplitude of the resonance signal AIN are decided by the transformation ratio (turn ratio of the primary coil L1 and the secondary coil L2), such a resonance signal AIN is acquirable by making the amplitude (B3) in the ON period of the primary side resonance signal SW larger than the amplitude (B4) in the OFF period. Also, given that the amplitude of the primary side resonance signal SW is dependent on the drive current that is supplied from the driver 110 (drive circuit 111), the output signal AOUT shown in FIG. 8 is acquirable if the current value of the second drive current is made smaller than the current value of the first drive current. Specifically, the current value of the drive current (B7) in the OFF period is decreased, compared with the current value of the drive current (B6) in the ON period. As mentioned above, the amplitude of the resonance signal AIN being small is not an issue, given that amplitude of the output signal AOUT (B5) that is output in the OFF period is not required.

Also, in this embodiment, finer control may be performed, rather than only performing two types of control consisting of ON period control and OFF period control. For example, the amplitude of the resonance signal in the OFF period is relatively small, and it is envisaged that generation of an appropriate output signal with this small amplitude (e.g., generation of an output waveform corresponding to a data signal of "1" with ASK modulation) will be difficult. Naturally, this is not an issue during the OFF period, but the possibility of this becoming an issue at the timing of switching from the OFF period to the ON period cannot be negated. Specifically, even though it is desirable that an output signal AOUT having a relatively large amplitude is output as soon as possible (in a narrow sense, immediately) after switching to the ON period, it may not be possible to output an appropriate output signal AOUT immediately after starting the ON period, due to the time taken for the resonance signal AIN to change from the small amplitude in the OFF period to a sufficiently large amplitude. In the case of the ASK modulation, even though it is desirable to output "1" data, the signal in the corresponding period may erroneously be determined to be "0" on the receiving side since the amplitude is insufficient.

In consideration of the above, rather than collectively controlling the ON period, the ON period may be controlled after being divided into a start period and a period other than the start period (period after the start period). Specifically, the driver 110 performs control that increases the current value of the first drive current in the start period of the ON period, compared with the period of the ON period other than the start period.

Here, the start period of the ON period indicates the period until a given period of time elapses after switching from the OFF period to the ON period.

Figure 9:
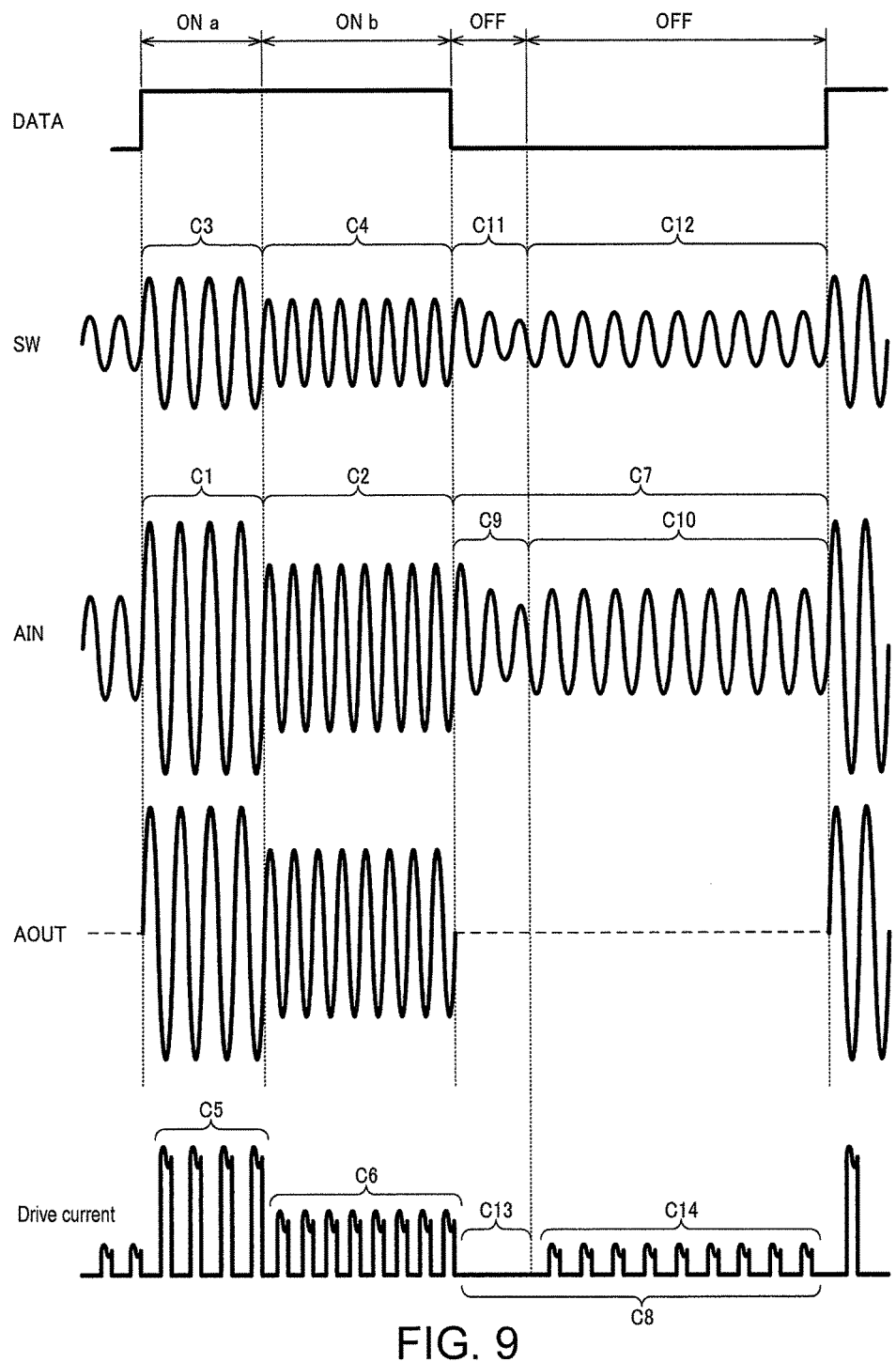
FIG. 9 shows exemplary control of the drive current in the ON period and the OFF period.

FIG. 9 shows time change waveforms of the respective signals in this case. As shown in FIG. 9, in the start period (C1) of the ON period, the amplitude of the resonance signal AIN is large, compared with the period (C2) of the ON period after the start period. Similarly to the example described above using FIG. 8, such a resonance signal AIN is acquirable by making the amplitude (C3) of the primary side resonance signal SW in the start period of the ON period larger than the amplitude (C4) in the period after the start period of the ON period, or more specifically, the current value of the drive current (C5) in the start period need only be made larger than the current value of the drive current (C6) of the period after the start period.

Also, FIG. 9 shows an example in which the amplitude (C7) of the resonance signal in the OFF period is even smaller compared with the period (C2) of the ON period other than the start period, and the current of the drive current (C8) of the OFF period is smaller compared with the drive current (C5, C6) of the ON period. This makes it possible to control the drive current over at least three stages. In other words, C5 is boost control for quickly increasing the amplitude of the resonance signal that was small in the OFF period, C6 is ON control that continues the amplitude required in data signal transmission, and C8 is OFF control that takes consideration of maintaining resonance. The relationship between boost control, ON control and OFF control is, however, not limited to FIG. 9. For example, a modification such as using a common current value for the drive current in C6 and C8 rather than distinguishing between ON control and OFF control is also possible.

Note that the issue here is switching from the OFF period to the ON period as mentioned above. Thus, in the case where a "1" data signal continues for 2 bits or more, for example, the ON period will continue for a period corresponding to the plurality of bits, although the boost control need only be performed in the ON period corresponding to the initial 1 bit.

Control may be performed by not only dividing the ON period into a start period and the period thereafter but also dividing the OFF period into a start period and the period thereafter. As mentioned above, since the amplitude of the output signal AOUT is 0 in the OFF period, the amplitude of the resonance signal AIN is not required. However, if the resonance itself stops, the resonance (oscillation) must be started from the beginning when the ON period is switched to, and it takes time for the resonance to be completed with sufficient amplitude. Even if the abovementioned boost control (C5) in the start period of the ON period is performed, it is important to maintain the resonance even in the OFF period, since time is required to start the resonance from zero. That is, the amplitude of the resonance signal AIN in the OFF period is desirably set to the minimum amplitude at which resonance can be maintained. In the case of reducing the drive current under such conditions, it is preferable to first reduce the amplitude to a minimum level as quickly as possible in the start period of the OFF period, and when the amplitude attenuates to that minimum level, to maintain that amplitude.

Specifically, in the start period of the OFF period, the driver 110 performs control that decreases the current value of the second drive current, compared with the period of the OFF period other than the start period (period after the start period has elapsed).

Here, the start period of the OFF period indicates the period until a given period of time elapses after switching from the ON period to the OFF period. Also, in the case where a "0" data signal continues for 2 bits or more, the OFF period will continue for a period corresponding to the plurality of bits, although control here need only be performed in the OFF period corresponding to the initial 1 bit, with this point being similar to the start period of the ON period.

Specifically, as shown in FIG. 9, in the start period of the OFF period (C9), the amplitude of the resonance signal AIN is small, compared with the period (C10) of the OFF period after the start period. The amplitude (C11) of the primary side resonance signal SW in the start period of the OFF period need only be made smaller than the amplitude (C12) in the period of the OFF period after the start period, and specifically the current value of the drive current (C13) in the start period of the OFF period need only be made smaller than the current value of the drive current (C14) of the period after the start period.

Note that when realizing the amplitudes shown in C11 and C12 in FIG. 9, the current value in the start period of the OFF period need only be smaller than the current value in the period after the start period, and as an example may be a given current value that is not OFF.

Alternatively, as shown in C13 in FIG. 9, the driver 110 may, in the start period of the OFF period, perform control that turns off the second drive current (in a narrow sense, sets the current value of the second drive current to 0). In the case where the drive current is 0, the amplitude up until then will be maintained in the hypothetical case of an ideal coil having zero loss, but since an actual coil has loss, the amplitude of the resonance signal decreases over time.

In that case, the start period of the OFF period need only be set to the period that it takes for the amplitude of the resonance signal in the ON period to attenuate due to this loss and attain the minimum amplitude that maintains a resonance, or to a shorter period. Since the resonance signal keeps a level that enables the resonance to be maintained at the end of the start period of the OFF period if such control is performed, the resonance is maintained throughout the OFF period without stopping, by supplying a drive current of a given current value that is not 0 after the start period has elapsed, enabling the subsequent transition to the ON period to be carried out smoothly. Furthermore, since the drive current in the start period of the OFF period can be cut, further power saving can be expected.

Note that FIG. 9 shows an example in which the drive current is controlled after dividing the ON period into a start period (corresponds to C1) and the period thereafter (corresponds to C2), and further dividing the OFF period into a start period (corresponds to C9) and the period thereafter (corresponds to C10). It is, however, not necessary for the driver 110 to perform all of these controls, and one or more of these controls may be performed by any component that performs control in which the current values of the drive current in at least two of the four periods differ, for example.

In order to realize the above controls, as shown in FIG. 1, the circuit device 100 may also include the storage 150 that stores setting values of the current value. Also, the driver 110 outputs a drive current to the resonant circuit 200 in accordance with a setting value. For example, the driver 110 may output a drive current in accordance with a setting value, by the controller 140 reading out a setting value from the storage 150, and outputting a control signal that is in accordance with the setting value to the driver 110. In this embodiment, since it is assumed that the controller 140 outputs the data signal DATA, it is possible for the controller 140 to determine whether it is the ON period or to determine whether it is the start period, and a setting value to be read out need only be selected based on this determination.

Hereinafter, the specific circuit configuration of the driver 110 (particularly the drive circuit 111) for realizing the above control will be described.

Figure 10:
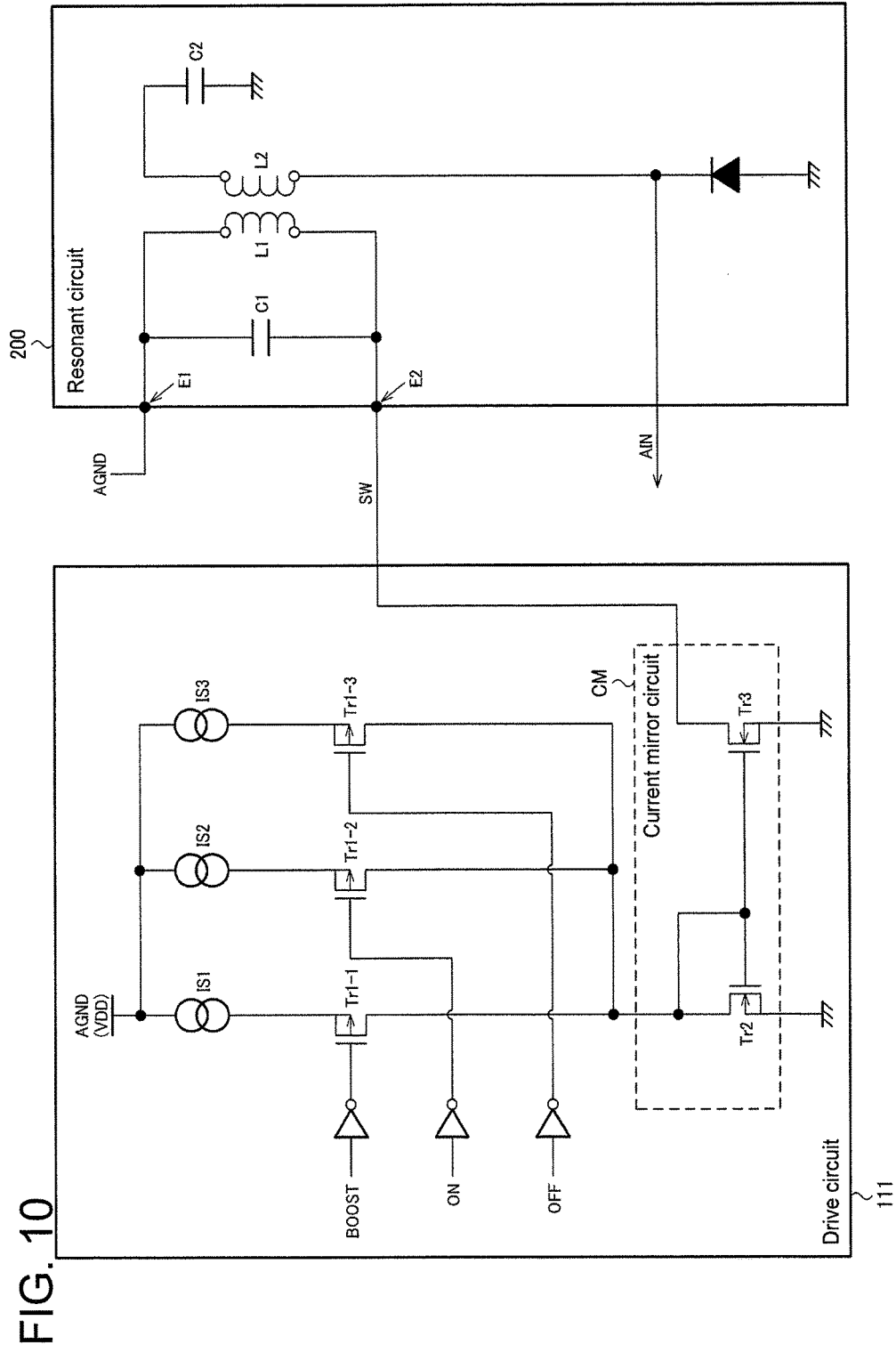
FIG. 10 shows an exemplary configuration of a drive circuit.

FIG. 10 shows a circuit configuration of the driver 110 (drive circuit 111). The drive circuit 111 includes a plurality of current sources IS1 to IS3 and a plurality of transistors Tr1-1 to Tr1-3. IS1 and Tr1-1 are connected in series between a given power supply voltage and a second transistor Tr2 constituting a current mirror circuit CM which will be discussed later. Here, although the reference voltage (analog ground AGND) that is generated by the reference voltage generator 130 can be utilized for the given power supply voltage, other voltages may also be used. Similarly, IS2 and Tr1-2 are connected in series between AGND and Tr2, and IS3 and Tr1-3 are connected in series between AGND and Tr2. Also, the set of IS1 and Tr1-1, the set of IS2 and Tr1-2 and the set of IS3 and Tr1-3 are connected in parallel to each other. Note that although FIG. 10 shows a configuration having three sets of a current source and a transistor, the number of sets is not limited thereto. As long as the driver 110 performing control that differentiates the current value in at least two periods, as mentioned above, is taken into consideration, there need only be two or more sets of a current source and a transistor In the example in FIG. 10, an inverted signal of a boost signal (BOOST) is input to a gate terminal of Tr1-1, an inverted signal of an ON signal (ON) is input to a gate terminal of Tr1-2, and an inverted signal of an OFF signal (OFF) is input to a gate terminal of Tr1-3. The boost signal is a signal that is at a high level in the period in which boost control of the drive current is performed and is at a low level in the remaining period, and specifically is at a high level in the start period of the ON period of the switch element 121. Similarly, the ON signal is a signal that is at a high level in the period in which ON control of the drive current is performed and is at a low level in the remaining period, and specifically is at a high level in the period of the ON period of the switch element 121 after the start period. Similarly, the OFF signal is a signal that is at a high level in the period in which OFF control of the drive current is performed and is at a low level in the remaining period, and specifically is at a high level in the OFF period of the switch element 121. Note that these respective inputs are inverted signals because Tr1-1 to Tr1-3 are P-type transistors, whereas if they were N-type transistors, inversion would not be required.

In other words, in the example in FIG. 10, tr1-1 to Tr1-3 (these transistors are collectively called first transistors, in order to distinguish from the two transistors Tr2 and Tr3 of the current mirror circuit CM discussed later) are elements that perform ON/OFF control of the current supply from a current source. A drive current based on the current from the current source IS1 is thereby supplied to the resonant circuit in the start period of the ON period, a drive current based on the current from the current source IS2 is supplied to the resonant circuit in the period of the ON period after the start period, and a drive current based on the current from the current source IS3 is supplied to a resonant circuit in the OFF period. If the current values are set as IS1>IS2>IS3, it become possible to realize the controls described above using FIGS. 8 and 9. Note that although FIG. 10 shows an example in which three current controls, namely, boost control, ON control and OFF control, are performed, it is possible to realize drive current controls other than those in FIGS. 8 and 9, by providing an appropriate number of current sources that output currents of appropriate current values and transistors that are connected to respective current sources and turned on at an appropriate timing.

The drive circuit 111 may, as shown in FIG. 10, also include a current mirror circuit CM that mirrors the current from a current source (one of IS1 to IS3 in the example in FIG. 10). It becomes possible to inhibit characteristic change (e.g., change of the current value, etc.) and supply a stable drive current to the resonant circuit 200 by using the current mirror circuit CM.

The current mirror circuit CM includes a second transistor Tr2 to which flows the current from the current source, and a third transistor Tr3 whose gate node is connected in common to the gate node of the transistor Tr2 and that outputs a drive current to the resonant circuit 200. The current that is supplied from the current source via the first transistor is thereby amplified by a current ratio that is determined by the size ratio of Tr2 and Tr3, and is output to the resonant circuit 200.

The current ratio referred to here will unavoidably be less than 1 (since the current of the current source is supplied to the resonant circuit 200 after being unavoidably reduced), but is, in terms of efficiency, preferably a value of a certain size, such as a value of around 10, for example. This is because the current that flows to the second transistor Tr2 is not utilized in resonance and is lost, whereas the current that flows through the third transistor Tr3 is stored in the capacitor of the resonant circuit 200 and tends not to be lost, and thus it is efficient to increase the current value that flows through Tr3 compared with the current value that flows through Tr2.

Also, in the case where the resonant circuit 200 has a configuration including the primary coil L1 and the secondary coil L2, the reference voltage generator 130, as shown in FIG. 10, will output the reference voltage (AGND) of the primary side resonance signal to one end (E1) of the primary coil L1, and the driver 110 will output the drive current to the other end (E2) of the primary coil L1. Specifically, the other end (E2) of the primary coil L1 and the third transistor Tr3 of the current mirror circuit CM will be connected.

Also, although not directly related to controlling the current value of the drive current, the circuit device 100 may have a configuration for generating a power supply voltage that is used in ON/OFF control of the switch element 121 from the resonance signal AIN.

Figure 11:
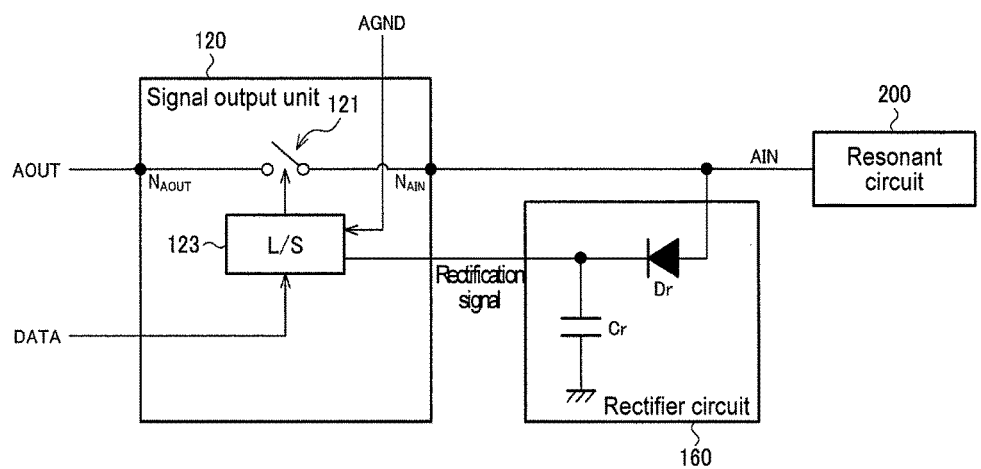
FIG. 11 shows an exemplary configuration of a rectifier circuit.

The configuration of the power supply voltage generation circuit for the switch element 121 is shown in FIG. 11. As shown in FIG. 11, the circuit device 100 includes a rectifier circuit 160 that generates a rectification signal for the power supply voltage of the switch element 121 from the resonance signal AIN, which is a signal obtained by boosting the primary side resonance signal SW, using the primary coil L1 and the secondary coil L2 of the resonant circuit 200. The rectifier circuit 160 can be realized by a half-wave rectifier circuit having a diode Dr and a capacitor Cr as shown in FIG. 11, for example.

Furthermore, when operating the switch element 121 using the output of the rectifier circuit 160, it is preferable to also take level shifting into consideration. This is because the primary side resonance signal (SW) is a signal centered on the reference voltage (AGND) from the reference voltage generator 130 as mentioned above, and thus when using the resonance signal AIN on the secondary side as the power supply voltage, it is preferable to return the reference to another voltage (in a narrow sense, to ground). Thus, the circuit device 100 (particularly the signal output unit 120) may also include a level shifter 123. Also, the switch element 121 operates based on the switching signal from the controller 140 and a signal obtained by level shifting the rectification signal from the rectifier circuit 160 to a signal based on the low potential side power supply voltage (GND).

The switching signal referred to here is a signal that is used in ON/OFF control of the switch element 121. Given that turning the switch element 121 on and off is determined according to the logic level of the data signal DATA, in the case where the signal output unit 120 is a modulation unit that performs ASK modulation, the switching signal corresponds to the data signal DATA.

2.2 Intermittent Current Supply

Figure 12:
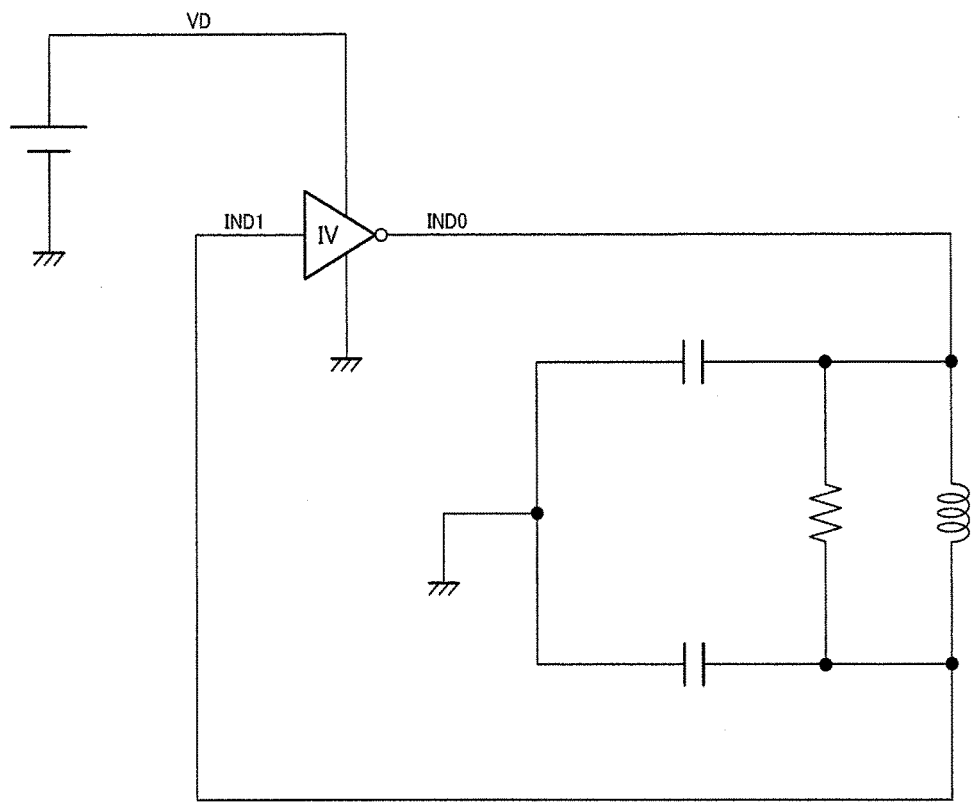
FIG. 12 shows an exemplary configuration of an existing Colpitts oscillator circuit.
Figure 13:
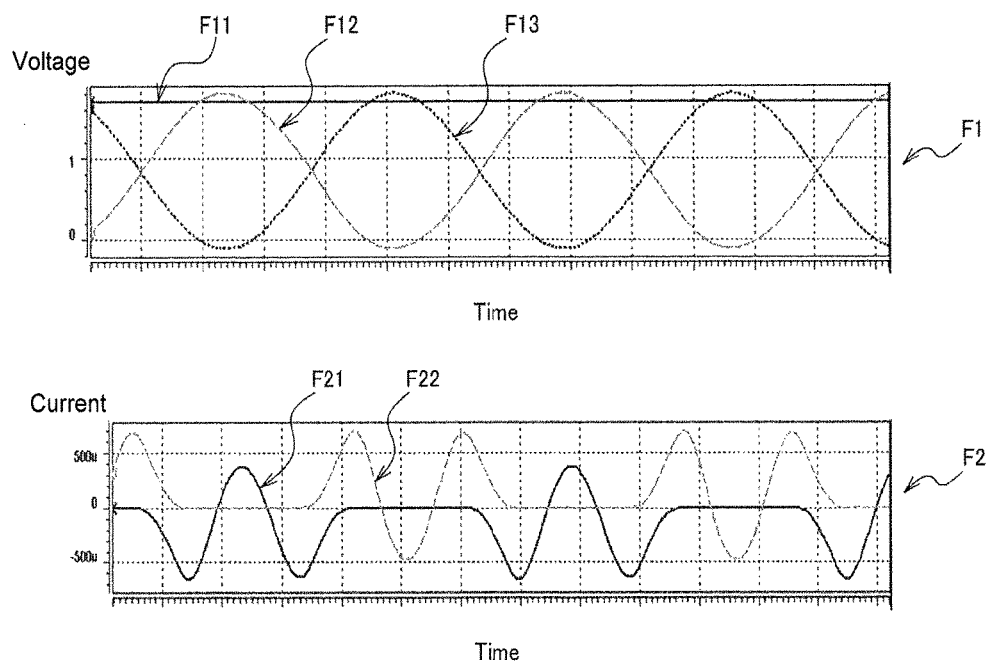
FIG. 13 shows an exemplary signal waveform of an existing Colpitts oscillator circuit.

FIG. 12 shows an exemplary configuration of a widely known Colpitts oscillator circuit, as a comparative example to the technique of this embodiment, and F1 and F2 in FIG. 13 respectively show an exemplary time change waveform of the voltage of the Colpitts oscillator circuit and an exemplary time change waveform of the current.

As shown in FIG. 12, a resonance signal is output by supplying a power supply voltage VD to an inverter IV. Specifically, as shown by F11 in FIG. 13, by supplying the constant voltage VD, the voltage value becomes sinusoidal, as shown by IND0 (F12) and IND1 (F13).

The current value in this case is F2, F21 indicates the current value that flows through a P-type transistor constituting the inverter IV, and F22 indicates the current value that flows through an N-type transistor constituting the inverter IV.

As is evident from F1 and F2 in FIG. 13, with an existing Colpitts oscillator circuit, power consumption is large since power is constantly supplied (F11, F21, F22) continuously. Signal supply is required even after the output of the resonance signal is started in the resonant circuit (even after starting resonance) because there is loss in the elements constituting the resonant circuit. Loss is unavoidable if resistive elements R are used. Also, while the coils L ideally have zero loss, such elements are not realistic and it is assumed that the coils L also have loss. In other words, since the amplitude will attenuate due to the loss if left alone, power supply to the resonant circuit is essential in order to maintain the resonance.

However, even though power supply is essential, input that replenishes the loss caused by the circuit elements is sufficient, and current does not need to be input constantly as shown in FIG. 13. In other words, the drive current may be intermittent as long as efficient power supply is performed. Intermittent as referred to here means there is a period when the drive current is ON (takes a non-zero value) and a period when the drive current is OFF (takes a zero value or a value sufficiently close thereto).

In view of this, the applicant proposes the circuit device 100 that drives the resonant circuit 200 using an intermittent drive signal, that is, a drive pulse signal. Specifically, the circuit device 100 includes the driver 110 that performs drive control of the resonant circuit 200, and the driver 110, as shown in FIG. 2, includes the drive timing setting circuit 113 that monitors the resonance waveform of the resonant circuit and sets the drive timing based on a monitoring result, and the drive circuit 111 that outputs a plurality of drive pulse signals whose drive timing of each drive pulse signal has been set by the drive timing setting circuit 113 to the resonant circuit 200.

This enables the resonant circuit 200 to be driven using a drive pulse signal, thus providing a period in which the drive signal is turned off and making it possible to reduce power consumption. At this time, the drive timing (timing at which the drive pulse signal is switched to a high level) is set based on the result of monitoring the resonance waveform, thus enabling appropriate setup. Ideally, it is sufficient to estimate the degree of attenuation from the prescribed amplitude of the resonance waveform, and input a drive pulse signal that compensates for this attenuation. However, associating the cycle (phase) of the resonance waveform and the drive pulse signal is assumed, taking ease of control into consideration. For example, the drive timing need only be set so as to input a drive pulse signal having a predetermined pulse width once in predetermined cycles of the resonance waveform (in a narrow sense, once in one cycle). It is assumed that if the amplitude of the resonance signal is in a state of being maintained, the loss per cycle will be a constant to a certain extent. In other words, balancing loss and supply is facilitated by supplying a predetermined amount of power according to the cycle of the resonance waveform. In other words, the "plurality of drive pulse signals" referred to here indicate pulse signals (three substantially rectangular pulse signals in the case of G5 in FIG. 15 discussed later) that are output at a plurality of temporally different timings (periods), and, in a narrow sense, indicate signals that are output once per cycle of the resonance waveform over multiple cycles.

Figure 14:
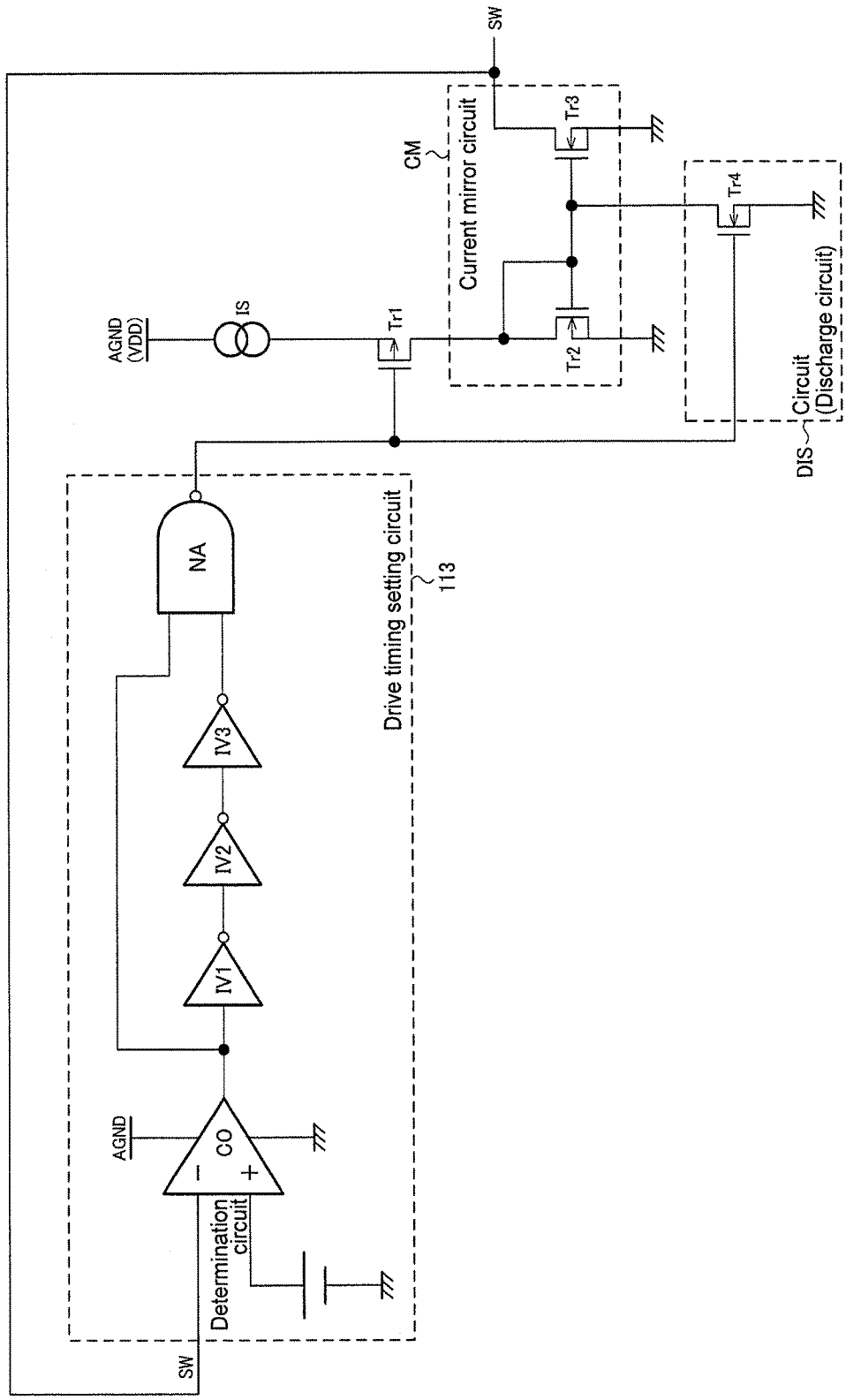
FIG. 14 shows an exemplary configuration of a drive circuit and a drive timing setting circuit.

An exemplary configuration of the driver 110 is shown in FIG. 14. As shown in FIG. 14, the drive circuit 111 includes a current source IS and a first transistor Tr1 that is supplied with the current from the current source IS and controlled (set to ON) by a drive timing signal from the drive timing setting circuit 113. The drive circuit 111 outputs a current pulse as the drive pulse signal, using the current source IS and the first transistor Tr1.

Specifically, the drive timing signal need only be supplied to the gate node of the first transistor Tr1. If the first transistor Tr1 is a P-type transistor, the current from the current source IS will be supplied only during the drive timing, by inputting an inverted signal of the drive timing signal to the gate node, in the case where a signal that is at a high level at the timing at which current is supplied and at a low level at other timings is given as the drive timing signal.

The drive circuit 111 may also include a current mirror circuit CM that mirrors the current that flows from the current source IS via the first transistor Tr1. The current mirror circuit CM includes a second transistor Tr2 to which flows the current that flows from the current source IS via the first transistor Tr1, and a third transistor Tr3 whose gate node is connected in common to the gate node of the second transistor Tr2 and that outputs a current pulse to the resonant circuit 200. In this case, the drive circuit 111 outputs the current pulse, using the current mirror circuit CM.

This enables fluctuation in the current value and the like to be inhibited and a stable current to be supplied to the resonant circuit as the current pulse. Note that setting the current ratio of Tr2 and Tr3 to be similar to the example described above using FIG. 10, efficient supply of the current pulse becomes possible.

The ability, however, of the third transistor Tr3 to track signal changes (operation becomes slow) as a result of increasing the current ratio (increasing the current that flows to Tr3 compared with the current that flows to Tr2). Thus, even after the first transistor Tr1 turns off and the current flowing through the second transistor Tr2 stops when the drive timing ends, the current flowing through the third transistor Tr3 does not immediately become 0, and current continues to flow for a certain amount of time. As a result, a current that is greater than or equal to the intended current is supplied to the resonant circuit 200, which is not preferable from the viewpoint of power saving.

Therefore, the drive circuit 111 may also include a circuit DIS that sets the third transistor Tr3 to an OFF state in the OFF period of the first transistor Tr1. Specifically, this circuit DIS is realized as a fourth transistor Tr4, as shown in FIG. 14, and the fourth transistor enters an ON state in the OFF period of the first transistor Tr1. For example, if Tr4 is an N-type transistor, Tr4 will be a transistor whose gate node is supplied with an inverted signal of the drive timing signal, whose drain node is connected to the gate node of the third transistor, and whose source node is connected to ground.

In the example in FIG. 14, the circuit DIS that is realized by the fourth transistor Tr4 can be thought of as a discharge circuit that discharges the gate nodes of the second transistor Tr2 and the third transistor Tr3 in the OFF period of the first transistor Tr1.

Since the current flowing in the abovementioned third transistor Tr3 is caused by the charge in the gate nodes, unwanted flow of current can be inhibited by providing the circuit DIS that discharges the gate nodes, enabling a further reduction in power consumption.

Next, a specific exemplary operation and exemplary circuit configuration of the drive timing setting circuit 113 will be described. As mentioned above, the drive timing setting circuit 113 monitors the resonance waveform, although in the case where the resonant circuit 200 has the primary coil L1 and the secondary coil L2 as shown in FIG. 5, the resonance waveform may be a waveform on the primary side (primary side resonance signal SW) or may be a waveform on the secondary side (resonance signal AIN). Here, the drive timing setting circuit 113 monitors the voltage at the other end of the primary coil L1 (the other end in the case where the side to which the reference voltage AGND is supplied from the reference voltage generator 130 is taken as one end), and sets drive timing based on the monitoring result. That is, the drive timing setting circuit 113 monitors the resonance waveform of the resonant circuit 200 by monitoring the primary side resonance signal SW.

More specifically, the drive timing setting circuit 113 compares a determination voltage set on the basis of the reference voltage (AGND) with a voltage (voltage of SW) at the other end of the primary coil L1, and sets the drive timing based on the comparison result. In a situation where the amplitude value is kept substantially constant, the phase at the timing at which the resonance waveform attains a given voltage value (timing during one cycle) may be considered to be substantially constant. In other words, an appropriate drive timing can be set, by comparing the voltage of the resonance waveform with a given determination voltage. Specifically, a current pulse can be supplied to the resonant circuit 200 at a predetermined timing in each cycle, enabling resonance of an appropriate amplitude to be maintained even with low power consumption. Note that the determination voltage need only be a voltage obtained by setting the voltage value thereof on the basis of the reference voltage (AGND), and is not limited to being generated using the reference voltage.

In particular, with the circuit configuration in FIG. 5, it is assumed that the reference voltage generator 130 outputs the reference voltage (AGND) of the primary side resonance signal SW to one end of the primary coil L1 and the driver 110 (drive circuit 111) outputs the drive pulse signal to the other end of the primary coil L1, and thus the resonance waveform becomes a waveform centered on the reference voltage. In other words, it becomes possible to appropriately perform comparison processing by setting the determination voltage based on the reference voltage AGND. For example, even if the amplitude value (voltage value) of the resonance waveform shifts slightly, the extreme case of losing the timing at which the amplitude value of the resonance waveform matches the determination voltage does not readily occur, and the possibility of the determination processing failing can be inhibited.

The specific circuit configuration that performs such comparison processing is as shown in FIG. 14, with the drive timing setting circuit 113 including a comparator CO, three stages of inverter circuits IV1 to IV3, and a NAND circuit NA. Note that the configuration of the drive timing setting circuit 113 can be variously modified, such as changing the number of inverter circuits. The primary side resonance signal SW is input to the inverting input terminal of the comparator CO, and a voltage that is based on the reference voltage is input to the non-inverting input terminal thereof. The input to the non-inverting input terminal is AGND−α (V), for example, and α is 0.1V or the like as an example. The output of the comparator CO itself and a signal obtained by that output passing through the three stages of inverter circuits IV1 to IV3 are input to the NAND circuit NA.

Figure 15:
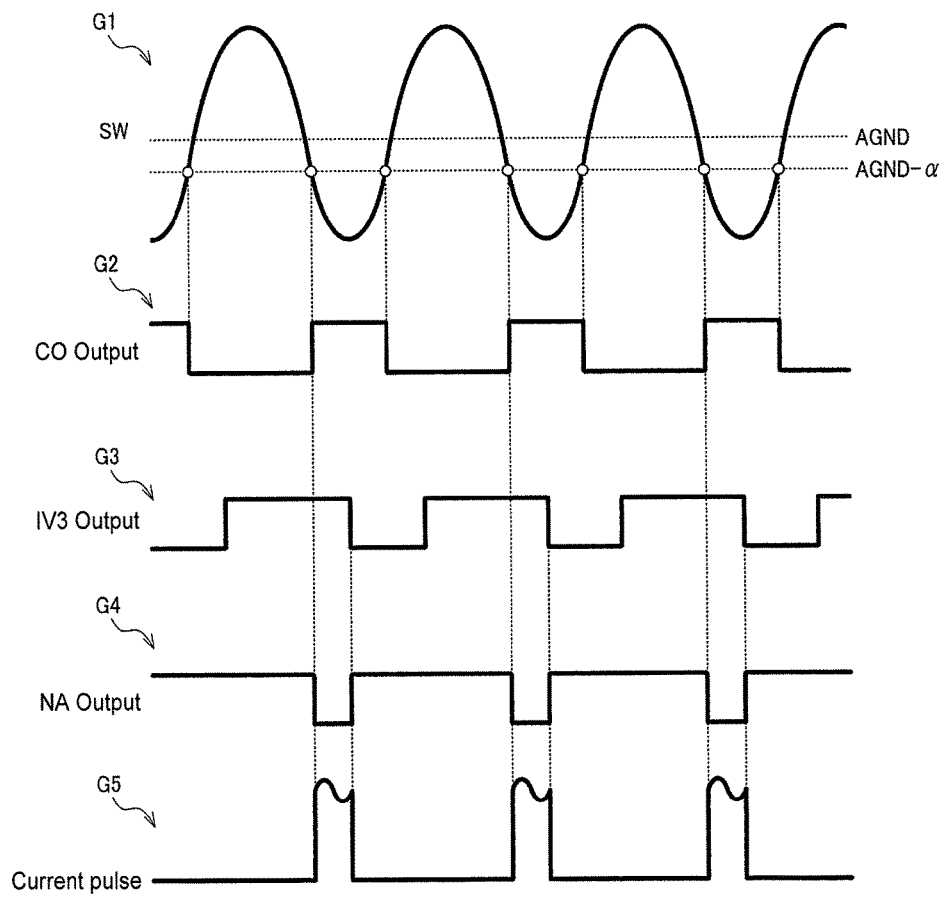
FIG. 15 shows an exemplary primary side resonance signal and signal waveforms of respective units of the drive timing setting circuit.

FIG. 15 shows exemplary time change waveforms of the respective signals. In the case where the resonance waveform (primary side resonance signal SW) is G1 in FIG. 15, the output of the comparator CO will be G2. In other words, a signal that is at a high level in the period in which the voltage value of the resonance waveform is less than the determination voltage is output from the comparator CO. Also, due to passing through the three stages of inverter circuits IV1 to IV3, the signal shown in G2 is delayed by a given amount of time and inverted to become the signal shown in G3. Since the signals of G2 and G3 are input to the NAND circuit NA, the output will be G4. In other words, by using the circuit shown in FIG. 14, a signal that is at a low level at the drive timing and at a high level at other timings, that is, the inverted signal of the drive timing signal, is output. The length of drive timing will be set using the delay time of the inverter circuits IV1 to IV3. If, however, the transistor is a P-type transistor, as shown by Tr1 of FIG. 14, the transistor can be turned on at the drive timing by the signal of G4 being input directly (or input after being inverted an even number of times). In this sense, both the inverted signal of G4 and the actual signal of G4 may broadly be considered to be drive timing signals in this embodiment By outputting the signal shown in G4 to the first transistor Tr1, the drive pulse signal (current pulse) becomes the signal shown in G5 of FIG. 15. As is evident from a comparison of G1 and G5, a current of a predetermined amount is supplied to the resonant circuit 200 once every cycle of the resonance, enabling the resonance to maintained using a small current compared with the case where the current is supplied continuously.

2.3 Current Value Control of Current Pulse

Above, two controls, namely, control of the current value of the drive current and control of the drive timing corresponding to the output timing of the drive signal were described. However, these controls are not limited to being performed independently, and may both be combined.

Figure 16:
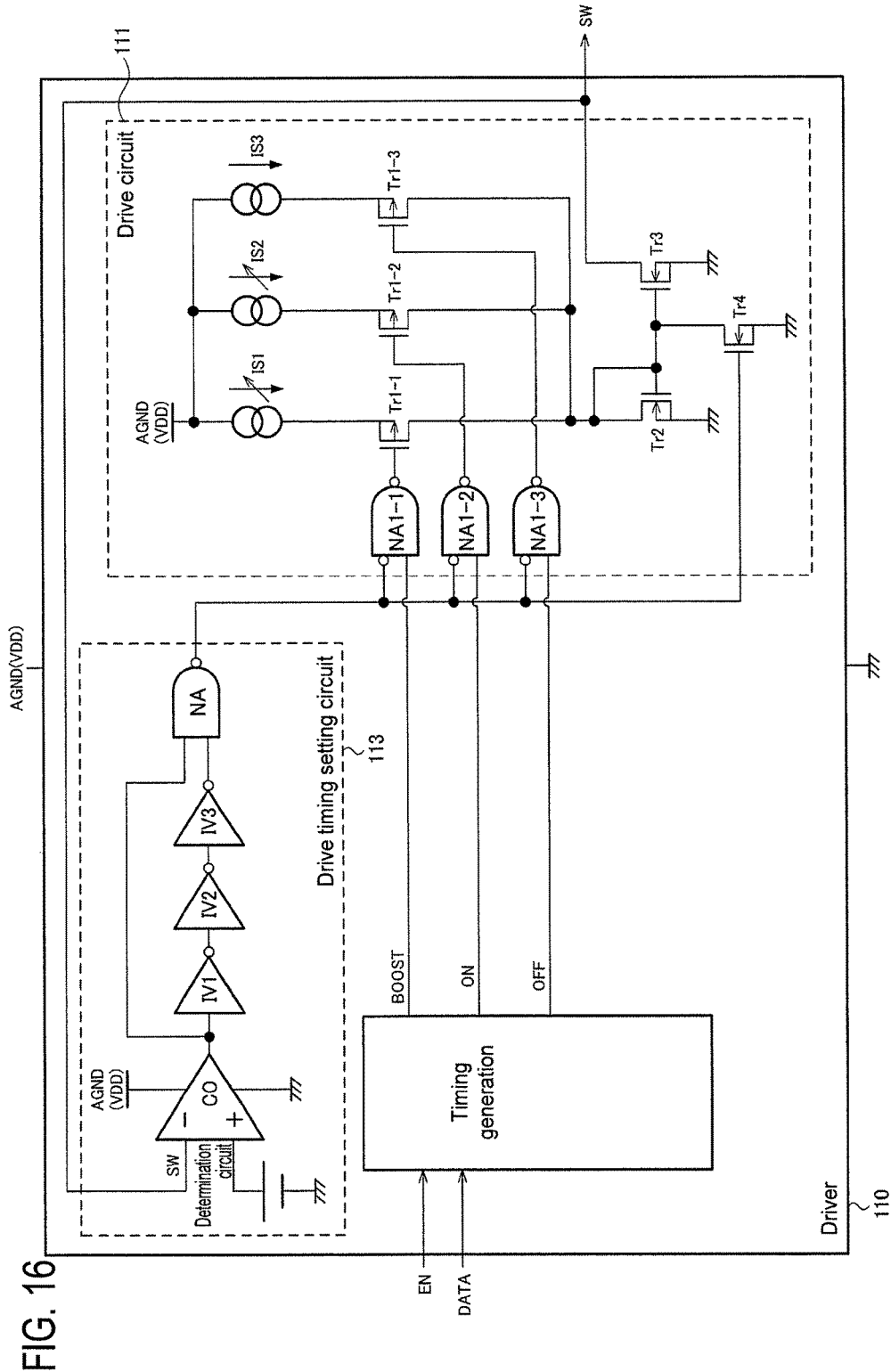
FIG. 16 shows an exemplary circuit configuration of a driver.

FIG. 16 shows a specific exemplary circuit configuration. Note that the same reference signs are given to configuration that is similar to FIG. 10 or 14, and a detailed description thereof is omitted. As is evident from FIG. 16, the drive circuit 111 has a plurality of sets of a current source and a first transistor that performs ON/OFF control of the current supply of the current source, similarly to FIG. 10. It thereby becomes possible to control the current value according to the ON period and the OFF period of the switch element 121, similarly to the example described above using FIG. 10.

At that time, the signal that is supplied to one of the gate nodes in the first transistors (Tr1-1 in FIG. 16) is the NAND output of the boost signal and the inverted signal of the output of the drive timing setting circuit 113. Considering that the Tr1-1 is a P-type transistor, tr1-1 will be ON in the case where the drive timing signal is at a high level (at the drive timing) and the boost signal is at a high level, and outputs the current from the current source IS1 to the current mirror circuit CM.

Similarly, the NAND output of the ON signal and the inverted signal of the output of the drive timing setting circuit 113 is supplied to the gate node of Tr1-2, and the NAND output of the OFF signal and the inverted signal of the output of the drive timing setting circuit 113 is supplied to the gate node of Tr1-3.

By adopting such as circuit configuration, in the period in which boost control is performed, that is, in the start period of the ON period as mentioned above, an intermittent drive current (current pulse) having a relatively large amplitude value is output to the resonant circuit 200, based on the current from the current source IS1. Also, in the period in which ON control is performed, that is, in the period of the ON period after the start period as mentioned above, an intermittent drive current (current pulse) having a moderate amplitude value is output to the resonant circuit 200, based on the current from the current source IS2. Also, in the period in which OFF control is performed, that is, in the OFF period as mentioned above, an intermittent drive current (current pulse) having a relatively small amplitude value is output to the resonant circuit 200, based on the current from the current source IS3.

This enables combined application of both power saving from the viewpoint of the current value and power saving on the time-axis, enabling a further reduction in power consumption.

Figure 17:
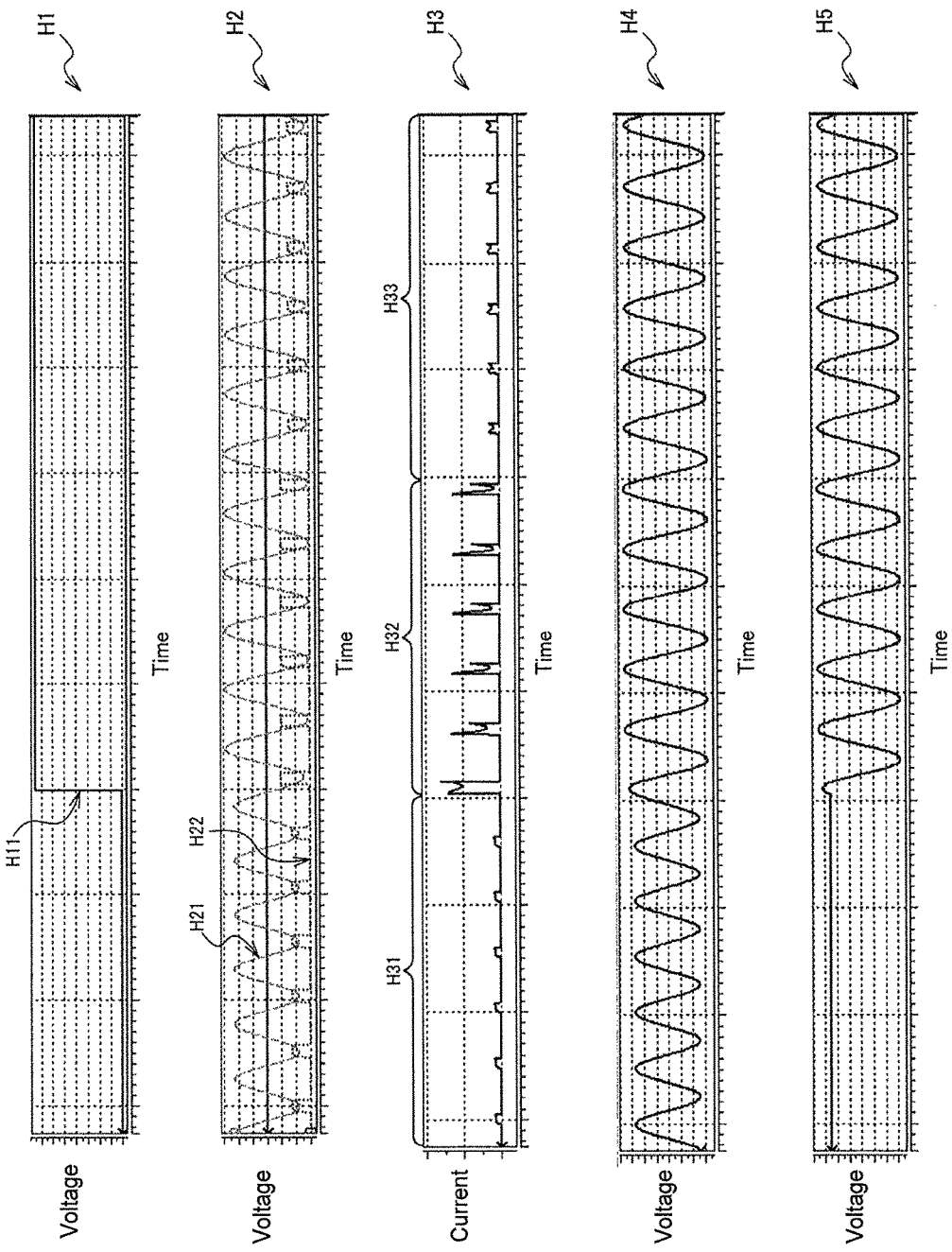
FIG. 17 shows exemplary signal waveforms of respective signals in the ON period and the OFF period.
Figure 18:
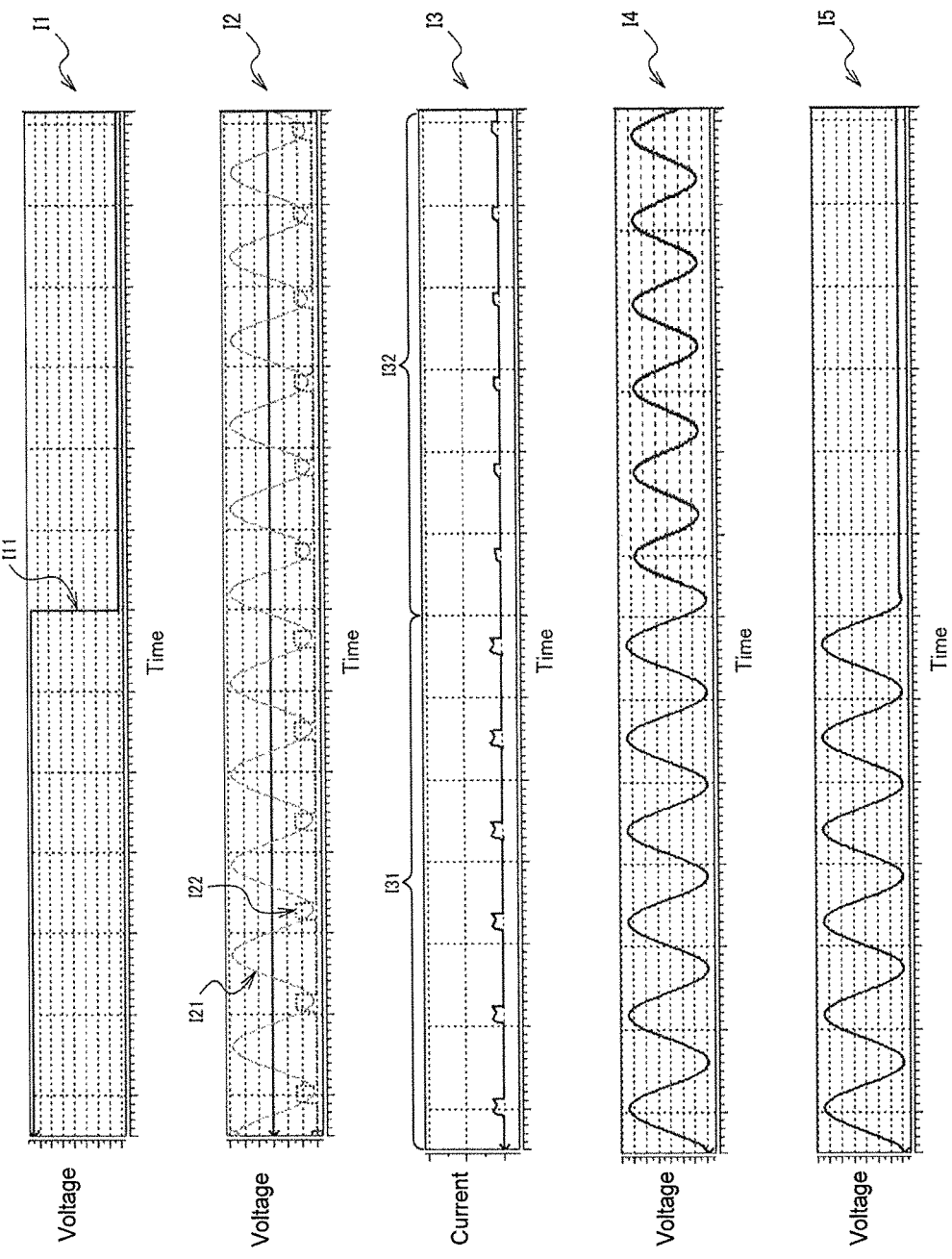
FIG. 18 shows exemplary signal waveforms of respective signals in the ON period and the OFF period.

Exemplary time change waveforms of specific signals are shown in FIGS. 17 and 18. H1 in FIG. 17 is the waveform of the data signal, H2 is the waveform of the primary side resonance signal SW and the drive timing signal, and H3 is the waveform of the drive current, H4 is the waveform of the resonance signal AIN, and H5 is the waveform of the output signal AOUT. Also, with regard to I1 to I5 in FIG. 18, a data signal, a primary side resonance signal and a drive timing signal, a drive current, a resonance signal and an output signal are similarly arranged.

As shown in H1, in FIG. 17 the data signal switches from a low level to a high level at the timing shown by H11. In H2, H21 indicates the primary side resonance signal SW, and H22 indicates the drive timing signal. H21 has a small amplitude in the period (OFF period) before H11, and the amplitude is large in the period (ON period) after H11. However, in both cases, the amplitude of the primary side resonance signal SW is sufficient, and thus a problem exists in that there is a period in which the signal level decreases below the determination voltage, and, as shown by H22, there is a period (drive timing) in which the drive timing signal is at a high level once every cycle.

As is evident from a comparison of H3 and H22, the drive current is output as the current pulse at the timing at which the drive timing signal will be at a high level. At this time, the current value of the current pulse changes according to the data signal (H1). Specifically, in the OFF period (H31), the current value is relatively small, and in the start period (H32) of the ON period, which is the boost period, the current value is relatively large. In contrast, in the period (H33) of the ON period after the start period, the current value becomes a moderate value.

The size of the resonance signal (H4) corresponds to the primary side resonance signal (H21), and the output signal (H5) becomes a signal obtained by modulating the resonance signal with the data signal (H1). Since this point is as described above, a detailed description thereof is omitted.

Also, as shown in I1, in FIG. 18 the data signal switches from a high level to a low level at the timing shown by I11. Thus, the amplitude of the primary side resonance signal (I21) attenuates in the period after I11, compared with the period before I11. Since the amplitude of the primary side resonance signal SW is, however, also sufficient in this case, there is a period in which the signal level decreases below the determination voltage, and the drive timing signal is at a high level once every cycle similarly to H22 (I22).

The current value of the drive current (I3) is moderate in the period (I31) of the ON period after the start period, and becomes a relatively small value when transitioning to the OFF period (I32). Note that, as described above using FIG. 9, a modification in which the current value of the drive current is made even smaller (in a narrow sense, is set to OFF) in the start period of the OFF period is possible.

Since the resonance signal (I4) and the output signal (I5) are as described above, a detailed description thereof is omitted.

The technique shown in FIG. 16 can be thought of as being the technique for controlling the current value of the drive current that was described above using FIG. 10 to which is added a configuration in which the driver 110, in the ON period, outputs a plurality of first current pulses as the first drive current, and, in the OFF period, outputs a plurality of second current pulses as the second drive current. In this case, the driver 110 controls current value of at least one of the first current pulse and the second current pulse. In addition, the driver 110 outputs the first current pulse and the second current pulse, using the current sources (IS1 to IS3) and transistors (Tr1-1 to Tr1-3).

3. Startup Control

Next, control at the time of starting resonance will be described. With the configuration shown in FIG. 5 and the like, the input node $N_{AIN}$ to which the resonance signal AIN is input from the resonant circuit 200 and the output node $N_{AOUT}$ of the output signal AOUT are connected, in the case where the switch element 121 is turned on. Thus, in the case where a load of some sort is connected to the tip of $N_{AOUT}$, that load will also be targeted to be driven by the resonant circuit 200. Note that connection of a load may involve an element of another circuit device or the like being connected to an output terminal of AOUT as a result of the output terminal of AOUT physically contacting the other circuit device, or may involve mutual interference due to electromagnetic induction or the like in a contactless state, such as contactless power transmission.

In any event, in the case where a heavy load, such as a capacitor with a large capacitance, for example, is connected to the tip of $N_{AOUT}$, the presence of the capacitor must be taken into consideration in terms of the resonance. For example, even if a current is supplied that can maintain a resonance having sufficient amplitude in the case were the capacitor is not provided, the amplitude of the resonance signal (primary side resonance signal SW and resonance signal AIN) could possibly attenuate with the current due to the capacitor being connected, and the resonance itself may stop in some cases.

In other words, with the circuit device 100, a control that restarts the resonance in the case where the resonance stops is needed. In particular, in the case of using a technique for maintaining the resonance of the resonant circuit 200 by monitoring the resonance waveform (primary side resonance signal SW) and supplying a current based on the monitoring result as shown in FIGS. 14 to 18, the amplitude of the primary side resonance signal SW decreases due to a high load being connected on the output side. Thus, cases arise where the result of comparing the voltage of the primary side resonance signal SW with a given determination signal does not satisfy the conditions for outputting the drive current. For example, the drive timing signal may not be output (G4 in FIG. 15 will constantly be at a high level) due to there not being a period in which the voltage of the primary side resonance signal SW falls to AGND−α(V) or less. Thus, with the technique of FIGS. 14 to 18, the resonance stops when the high load is connected, and the resonance cannot be resumed in that state. In other words, in the case of an existing technique such as the Colpitts oscillator circuit shown in FIGS. 12 and 13, a drive signal is constantly supplied, and thus the resonance does not stop, or even if the resonance does stop temporarily, there is no need for a clear restart control, whereas restarting is an important element of the configuration in FIGS. 14 to 18.

The circuit device 100 that performs startup control includes the driver 110 that outputs a drive signal to the resonant circuit 200, and the controller 140, as shown in FIG. 1. The controller 140 outputs a startup signal (enable signal EN) in a startup period for starting the resonance of the resonant circuit 200, and starts the resonance of the resonant circuit 200 by the driver 110. Furthermore, the controller 140 monitors the resonance state of the resonant circuit 200, and re-outputs the startup signal in the case where stoppage of the resonance of the resonant circuit 200 is detected after the resonant circuit 200 was started up.

This enables the resonance to be restarted if necessary, after having monitored the resonance state, in addition to performing initial startup (startup of the resonance when starting up the circuit device 100). Thus, it also becomes possible to start the resonance again and resume the signal output, in the case where the resonance has stopped, such as when a high load is connected to the tip of the output terminal of AOUT.

At that time, it is preferable to turn off the switch element 121 of the signal output unit 120 in the startup period. As mentioned above, one conceivable factor causing the resonance to stop is a high load being connected to the tip of the switch element 121 (output terminal of the output signal AOUT of the circuit device 100). Thus, even when a startup signal is output in an attempt to start the resonance, if a high load is connected, the resonant circuit 200 must start resonance with this load included, making it difficult to resonate stably.

In that respect, if the switch element 121 is turned off in the startup period (includes both the period in which the initial startup is performed and the period in which restarting is performed), the resonant circuit 200 and the output terminal of AOUT will not be connected, and thus even if a high load is connected to the output terminal, this load does not affect the resonance of the resonant circuit 200, and a stable resonance (oscillation) can be attained. Also, the switch element 121 need only be turned on after the completion of the resonance.

Note that if a high load is connected to the output terminal of AOUT when switching to the ON period of the switch element 121, there is a possibility that resonance may stop again at that timing, although this is allowed in this embodiment. In this case also, stable restarting of the resonance is performed using the following sequence, by monitoring the resonance waveform of the controller 140: turn off switch element 121 again→transmit startup signal→start resonance by driver 110.

The "high load" referred to here is assumed to be a load that is large enough to affect the resonance. In other words, this load is an irregular load that the circuit device 100 was not designed to have connected thereto when performing normal operations (e.g., when transmitting important data from the signal output unit 120). Even if resonance stops at the timing at which such an irregular load is connected, this is not an issue for the circuit device 100 according to this embodiment, the resonant circuit 200 need only be resonating when the load is disconnected. That is, when the resonance stops, the switch element 121 need only be temporarily turned off and the resonance restarted, and whether or not the high load is still connected or has been disconnected when the switch element 121 is turned on again need not be particularly taken into consideration in the restart sequence.

For example, consider the case where an electronic device having the circuit device 100 according to this embodiment includes a conduction member that is exposed to the outside, and transmits and receives information by bringing the conduction member in contact with a device on the receiving side of transmission data. This member is connected to the output terminal of AOUT of the circuit device inside the electronic device. In this case, given that the member is exposed outside the electronic device, the user may possibly contact the member with his or her fingers, in which case a high load will be connected to the output terminal. However, in this example, it is difficult to imagine a use mode in which the user brings the member in contact with the receiving side apparatus while touching the member with his or her fingers, given that member must contact the receiving side apparatus at the time of information transmission. In other words, since it can be assumed to a certain degree that the user's fingers will have been removed from the member at the time of information transmission, appropriate information transmission can be realized by performing the abovementioned controls.

Figure 19:
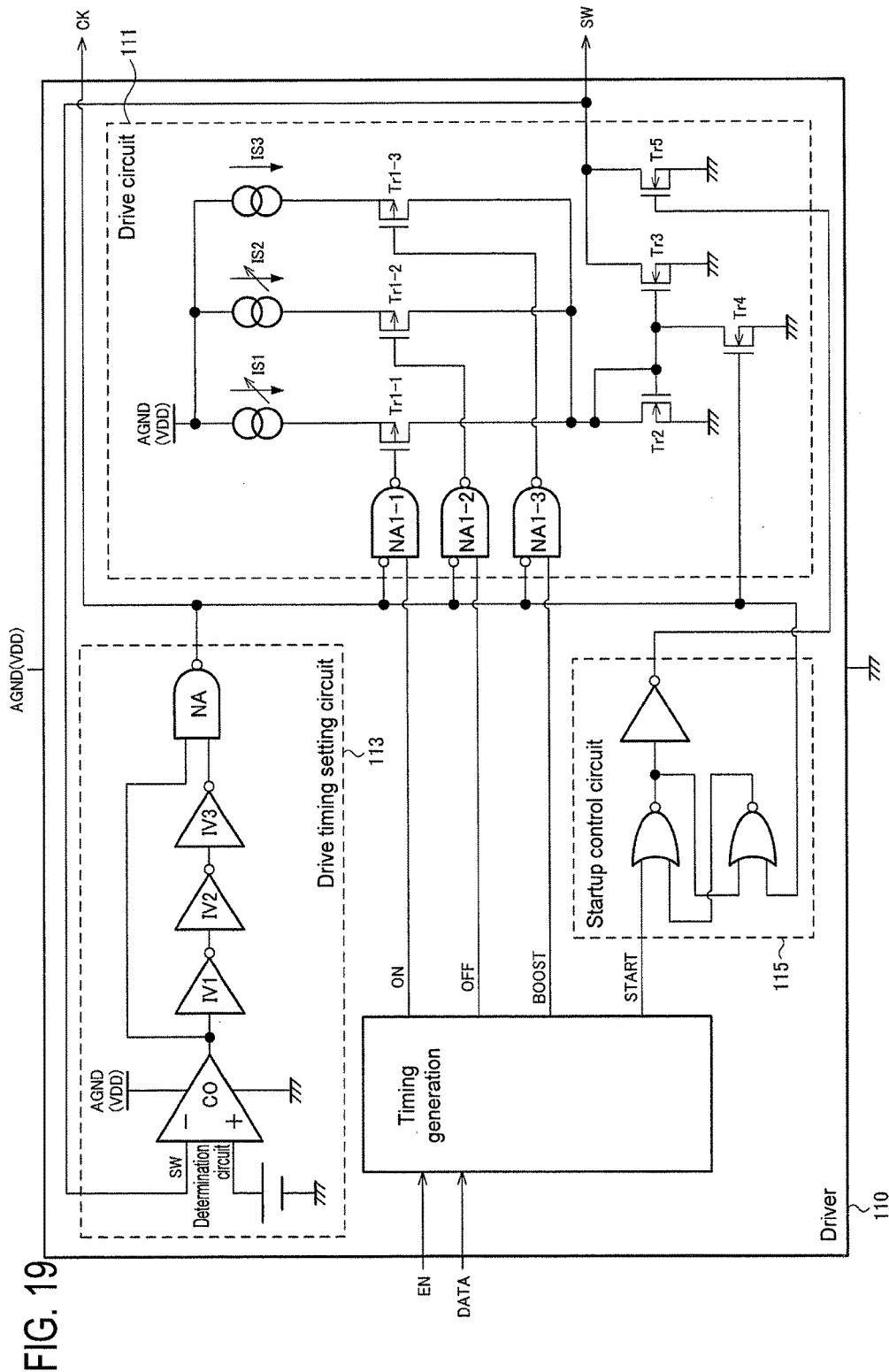
FIG. 19 shows another exemplary circuit configuration of a driver.

FIG. 19 illustrates a specific exemplary circuit configuration that realizes the above startup controls. As shown in FIG. 19, the driver 110 includes the startup control circuit 115 that is controlled by the controller 140. Also, the drive circuit 111 has a startup transistor Tr5 that is turned on by the startup control circuit 115 in the startup period, and the drive circuit 111 outputs a startup current pulse generated by the startup transistor Tr5 being turned on as the drive pulse signal.

The startup control circuit 115 can be realized by a S-R flip-flop, as shown in FIG. 19, for example. The startup signal (enable signal EN) from the controller 140 is input to one input (S) of the S-R flip-flop. Also, the output (drive timing signal or an inverted signal thereof) of the drive timing setting circuit 113 is input to the other input (R) of the S-R flip-flop. As described above using FIG. 14 and the like, the drive timing setting circuit 113 outputs a signal indicating the result of comparing the voltage of the primary side resonance signal SW and a given determination voltage. Thus, the drive timing setting circuit 113 outputs a pulse signal in the case where resonance is performed appropriately and the amplitude of the primary side resonance signal SW is large to a certain extent, and outputs a constant value in the case where resonance is not being performed.

In other words, the startup control circuit 115 shown in FIG. 19 is a S-R flip-flop in which a Set switch is turned on in the case where the startup signal is input, and a Reset switch is turned on in the case where the amplitude of the resonance waveform (in a narrow sense, primary side resonance signal SW) has become sufficiently large. As a result, the startup transistor Tr5 to whose gate node the output of the S-R flip-flop is supplied will be ON from when the startup signal is input until when the amplitude of the resonance signal becomes sufficiently large, and outputs the startup pulse current. In other words, the startup period in this embodiment corresponds to a period from when the startup signal is input until when the amplitude of the resonance signal becomes sufficiently large.

Figure 20:
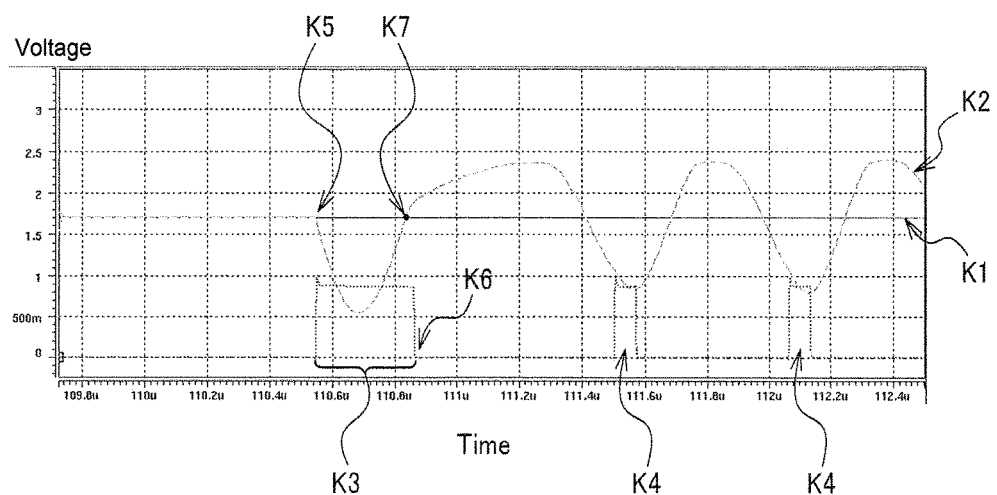
FIG. 20 shows an exemplary signal waveform at the time of startup.

A specific exemplary waveform is shown in FIG. 20. K1 in FIG. 20 indicates the reference voltage (AGND), K2 indicates the primary side resonance signal SW, K3 indicates the output of the startup control circuit 115, and K4 indicates the drive timing signal. The startup signal is input from the controller 140 at the timing corresponding to K5 in FIG. 21, the output of the startup control circuit 115 (S-R flip-flop) thereby changes, and the startup transistor Tr5 is turned on. Thereby, the startup pulse current is supplied to the resonant circuit 200, and the resonance is started as shown by K2. The startup pulse current is turned off (the startup transistor Tr5 is turned off) at the timing at which the amplitude of the resonance waveform became large to a certain extent (K6 in FIG. 21), and thereafter, based on the drive timing signal from the drive timing setting circuit 113 as described above using FIG. 14 and the like, the drive circuit 111 outputs the current pulse from the current source IS to the resonant circuit 200. As is evident from the example in FIG. 20, the startup pulse current that is supplied here need only be a signal that is able to increase the amplitude of the resonance signal to a certain extent, and, specifically, need only be a signal that is able to drive the resonant circuit 200 such that the amplitude of the resonance signal exceeds the determination voltage in comparison of the comparator CO in the drive timing setting circuit 113. If such conditions are satisfied, the subsequent driving of the resonant circuit 200 can be realized by the configuration described above using FIG. 14 and the like.

Note that the configuration of the circuit device 100 of this embodiment is not limited to FIG. 19, and various modification can be made. For example, although, in FIG. 19, the transistor (in a narrow sense, first transistor Tr1) that is used at the time of normal operation differs from the startup transistor Tr5 that is used at the time of startup, a common transistor may be utilized. In other words, it is also possible to output a drive signal with the configuration described above using FIG. 16 and the like at the time of startup.

The current value of the startup pulse current that is used in startup is, however, desirably greater than or equal to the current value of the current pulse that is used in normal operation. This is because setting such a current value enables the resonance to be started in a comparatively short time, given that the amplitude needs to be changed from a 0 state to a relatively large state. Therefore, in cases such as where a sufficient current value cannot be secured with the configuration in FIG. 16, it is desirable that the configuration for normal operation that includes current sources IS and transistors (first transistors Tr1) and the configuration for startup are provided separately in the drive circuit 111, as shown in FIG. 19.

The startup control circuit 115 is also realizable with a simpler configuration, rather than the configuration in FIG. 19. In FIG. 19, the output of the drive timing setting circuit 113 is used as the Reset input because test results were obtained indicating that the resonance stops in the case where the falling timing (K6 in FIG. 20) of the drive pulse current coincides with the cross timing (K7 in FIG. 20) of the primary side resonance signal SW and the reference voltage (AGND). In the drive timing setting circuit 113, the determination voltage that is used to compare with the primary side resonance signal SW is assumed to differ (AGND−α) from the reference voltage, and thus by using a signal that is based on the comparison result as the Reset input, the voltage value of the primary side resonance signal SW at the falling timing of the drive pulse current will be a value that does not coincide with AGND.

In other words, as long as the condition that the falling timing of the drive pulse current does not coincide with the cross timing of the primary side resonance signal and reference voltage (AGND) is satisfied, the startup control circuit 115 may have a different configuration. For example, the pulse width of the startup pulse current may be set to a given fixed value, and the fixed value may be set such that length of the pulse width is clearly different from half wavelength of the primary side resonance signal SW. In this case, a S-R flip-flop does not need to be used as shown in FIG. 19, since the startup control circuit 115 need only generate a signal for outputting a drive pulse current that rises in correspondence with the input of the startup signal and has the pulse width of the fixed value.

Also, monitoring of the resonance state in the controller 140 can be realized by various techniques. Specifically, the voltage level of the primary side resonance signal SW or the like may be monitored, or the voltage level of the resonance signal AIN or the like may be monitored. Alternatively, if there is a clock signal CK that is based on the resonance signal, this clock signal CK may be monitored.

For example, the controller 140, as shown in FIG. 4, may monitor the resonance state of the resonant circuit 200, by detecting the clock signal CK generated based on the signal from the resonant circuit 200 using the watch dog timer 141. The watch dog timer 141 times out and executes exception processing, in the case where regular watch dog operations cannot be performed, which here is in the case where input of the clock signal CK cannot be performed. In other words, it becomes possible to execute the above startup control, by outputting the startup signal (enable signal EN) as the exception processing.

Figure 21:
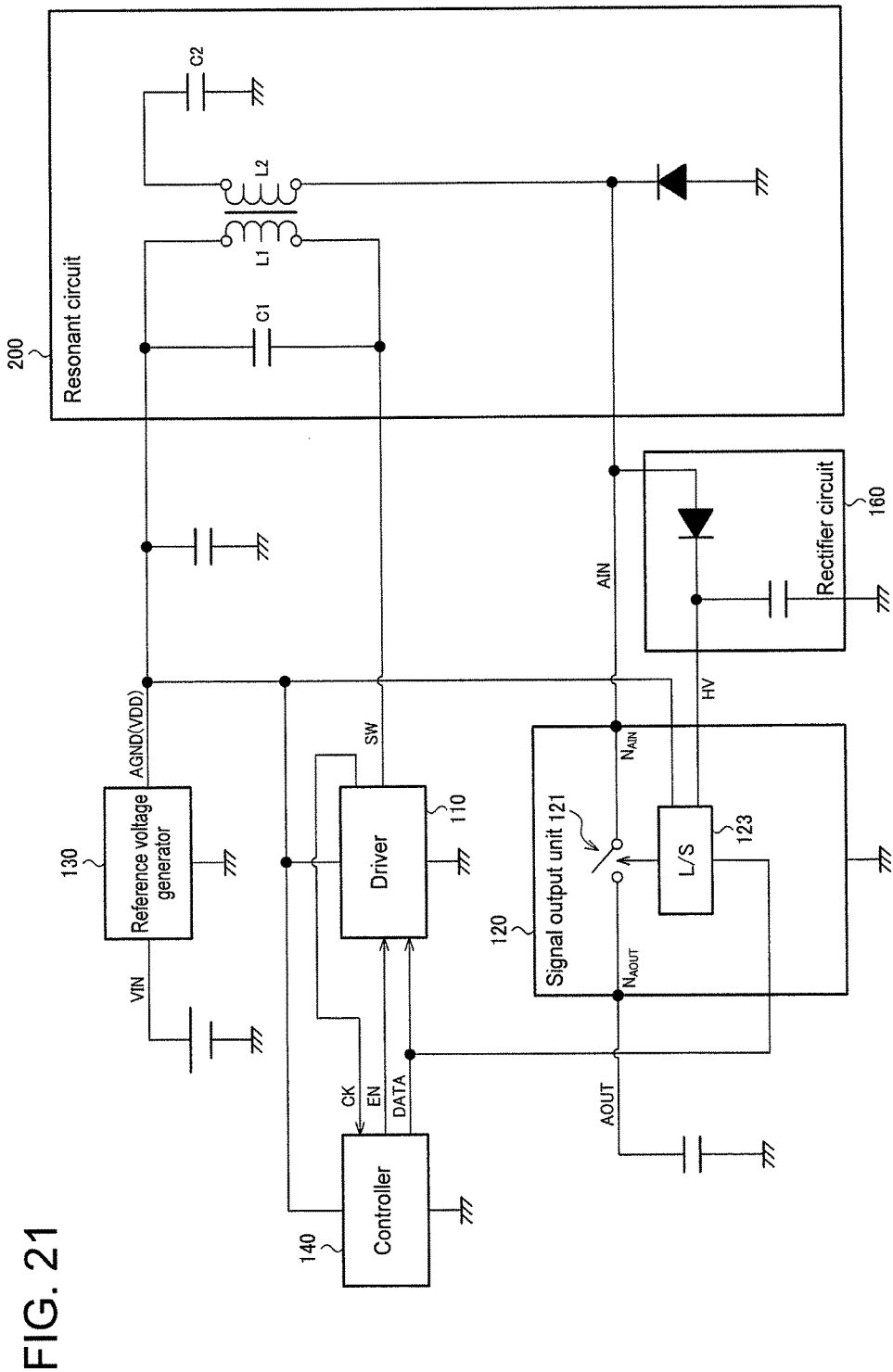
FIG. 21 shows other exemplary signal input/output between the resonant circuit and respective units of the circuit device.

Note that a circuit dedicated to generating the clock signal CK may be provided, although, as mentioned above, the drive timing setting circuit 113 compares the primary side resonance signal SW (voltage at a different end of the primary coil L1 from the side to which AGND is supplied) with a determination voltage in order to generate the drive timing signal. Also, the drive timing signal is a clock signal that is output in the case where the amplitude of the primary side resonance signal SW is large to a certain extent, and at a frequency of one clock per cycle of the resonance signal. In other words, as shown in FIG. 19, it is possible to utilize the output of the drive timing setting circuit 113 as the clock signal CK. In that case, as shown in FIG. 21, the clock signal CK is generated by the driver 110 (specifically, the drive timing setting circuit 113), and the controller 140 executes monitoring of the resonance state by acquiring this clock signal and monitoring the clock signal with the watch dog timer 141.

Note that the circuit device 100 related to startup control of this embodiment can also be taken as a circuit device that include the driver 110 that performs drive control of the resonant circuit 200, and the signal output unit 120 having the input node $N_{AIN}$ to which the resonance signal AIN from the resonant circuit 200 is input, the output node $N_{AOUT}$ of the output signal AOUT that is based on the resonance signal AIN, and the switch element 121 provided between the input node $N_{AIN}$ and the output node $N_{AOUT}$, and in which the switch element 121 of the signal output unit 120 is turned off in the startup period in which the driver 110 starts resonance of the resonant circuit 200. Such a configuration enables a circuit device 100 that stably starts resonance irrespective of whether a high load is connected to the output node $N_{AOUT}$ of the output signal AOUT to be realized.

The technique of this embodiment can also be applied to a circuit device that drives the resonant circuit 200, and that, in a startup period for starting resonance of the resonant circuit 200, output a startup signal to start resonance of the resonant circuit 200, monitors the resonance state of the resonant circuit 200, and re-outputs the startup signal in the case where stoppage of the resonance of the resonant circuit 200 is detected after the resonant circuit 200 was started.

4. Electronic Device and Other Matters

Figure 22:
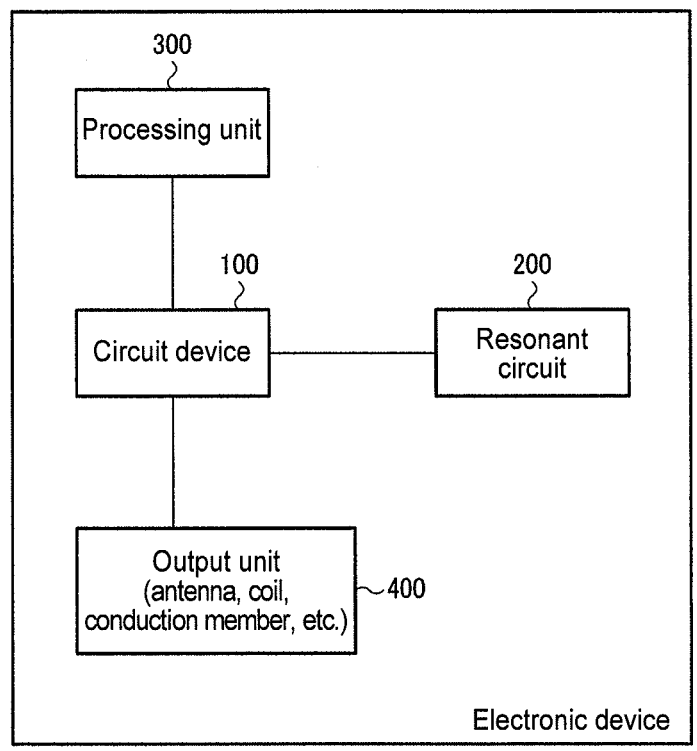
FIG. 22 shows an exemplary configuration of an electronic device that includes the circuit device.

Although a circuit device was described above, the technique of this embodiment is not limited to a circuit device, and the invention can also be applied to an electronic device that includes the above circuit device. Various modes of the electronic device according to this embodiment are conceivable. FIG. 22 shows an exemplary configuration of the electronic device. The electronic device may include the circuit device 100, the resonant circuit 200, a processing unit 300, and an output unit 400. The processing unit 300 performs various processing in the electronic device, and may control the circuit device 100, for example. The processing unit 300 can be realized by various processors, for example. The output unit 400 outputs the output signal AOUT from the signal output unit 120 of the circuit device 100. This output unit 400 is realizable by various configurations, such as an antenna, a coil, a conduction member and the like, as will be discussed later.

For example, the electronic device according to this embodiment may be an electronic device that transmits modulated signals (modulated waveforms) generated using a data signal (baseband signal) and a signal (carrier wave) from the resonant circuit 200 to other devices, as described above using FIG. 7. In particular, the abovementioned configuration that realizes power saving is highly compatible with a battery-operated electronic device, and the electronic device according to this embodiment may be a compact, lightweight device.

For example, if signals that are based on operations by a user are used as the abovementioned data signal, a device such as a remote controller can be realized as the electronic device according to this embodiment. Specifically, a keyless entry module or the like that is widely used in cars or the like is given as one example. The keyless entry module communicates with a moving body (car body) by wireless communication using an antenna, and controls locking and unlocking doors or the trunk, turning lights on and off, and the like on the movable body side, based on signals from the keyless entry module. The keyless entry module is typically provided with an operation unit such as buttons, and when a user operates the operation unit, operation information is notified to the car body side by wireless communication. In other words, in the case where a keyless entry module is realized as an electronic device including the circuit device 100 of this embodiment, the circuit device 100 need only acquire user operation information as a data signal, drive the resonant circuit 200 using the driver 110 to generate a carrier wave, and transmit a modulated signal generated using the data signal and the carrier wave to the car body via the antenna.

Also, as mentioned above, data transmission is not limited to transmission via an antenna, may be a mode in which a conduction member is brought in contact, or a mode in which elements such as coils are provided on the surface of the electronic device and transmission is performed using electromagnetic induction. For example, the electronic device according to this embodiment may be a device such as an electronic pen. An electronic pen is used as an input device in a computer such as a PC, for example, and is used as a set with a tablet (position detecting device), for example.

Specifically, when a given position of the tablet is instructed using the electronic pen (when a given position of the tablet is touched with the pen tip or the like, or when an operation such as moving the pen tip or the like close to a given position is performed), the tablet detects the instructed position and outputs the coordinates to the computer. Various configurations of the tablet are conceivable, and the tablet may be a thin tabular device which is shorter in the thickness direction (Z axis) than in the lengthwise direction (X axis) and the widthwise direction (Y axis), for example. The tablet includes a plurality of loop coils that are aligned in the X direction and a plurality of loop coils that are aligned in the Y direction. That is, the tablet has a group of loop coils disposed in an array in a direction along an XY plane.

With the electronic pen, the modulated signal shown in FIG. 7 is output to the pen tip, for example. Thus, in the case where the pen tip is moved close to the tablet, on the tablet side, the detection signal in a loop coil that is at a position near the pen tip increases compared with the detection signals of loop coils at positions that are relatively distant from the pen tip. Thus, in the detection circuit on the tablet side, for example, processing for scanning the detection signal level of each of a plurality of loop coils is performed, and if a loop coil with the largest detection signal is specified, it can be specified that a position corresponding to the specified loop coil was instructed using the electronic pen. That is, it becomes possible to use the tablet as a position detecting device.

In this case, the electronic pen, which is an electronic device according to this embodiment, need only take a configuration in which the modulated signal (output signal AOUT) that is output from output node $N_{AOUT}$ is transmitted to the loop coils of the tablet. As an example, the electronic pen may include a coil for use in transmission in a position corresponding to the pen tip, and the modulated signal from the output node may be output to the transmission coil. In this case, as long as the distance between the pen tip of the electronic pen and a given loop coil of the tablet is reasonably close, the transmission coil functions as a primary side coil and the loop coil functions as a secondary side coil, and the modulated signal is transmitted to the tablet side by electromagnetic induction. That is, a position detecting device employing an electromagnetic induction method becomes realizable.

At this time, not only a simple position but also information such as pen pressure may be transmitted from the electronic pen to the tablet. For example, the electronic pen may include a variable capacitor in the pen tip (core). The capacitance of this variable capacitor changes according to the amount of pressure on the core. Thus, the electronic pen becomes able to detect the information on pen pressure by detecting the capacitance change referred to here.

Information on the pen pressure and the like is transmitted to the tablet using a modulated signal as the value of the data signal DATA, and is further transmitted to a computer such as a PC and used when drawing lines or the like. Various sequences of position detection and information transmission are conceivable, and may have the two phases of first performing position detection processing and then transmitting information such as pen pressure, in units of a fixed period, for example. As an example, first, in the position detection phase, the secondary side output (resonance signal AIN) of the resonant circuit 200 is directly transmitted from the pen tip in a fixed period, without performing modulation. This is synonymous with only transmitting a data signal having bits whose value is one and that correspond in number to the fixed period. Then, a data signal consisting only of bits that depend on the detection accuracy of pen pressure is modulated and transmitted. For example, in the case where pen pressure detection over 256 gradations is performed, at least an 8-bit data signal need only be modulated and transmitted. Note that the information that is transmitted here is not limited to only pen pressure, and include other information, such as the information on the charge state of an electronic pen.

Alternatively, the core (conduction core) of a conductor may be provided in the tip of the electronic pen, and the modulated signal that is output from an output node may be applied to the conduction core. The modulated signal is transmitted to the tablet, by bringing the conduction core in contact with the tablet surface. Note that position detection in this case can use a known widely capacitive coupling method.

Also, although a keyless entry module and an electronic pen were described here as exemplary electronic devices according to this embodiment, the technique of this embodiment can be applied to various electronic devices including the circuit device described above.

Note that although this embodiment has been described in detail above, a person skilled in the art will appreciate that numerous modifications can be made without substantially departing from the novel matter and effects of the invention. Accordingly, all such modifications are deemed to be within the scope of the invention. For example, terms that appear in the description or drawings at least once together with other broader or synonymous terms can be replaced by those other terms at any place within the description or drawings. Also, the configurations and operations of the circuit device and electronic devices are not limited to those described in the present embodiment, and various modifications can be made.

The entire disclosure of Japanese Patent Application No. 2015-179592, filed Sep. 11, 2015 is expressly incorporated by reference herein.

What is claimed is:

1. A circuit device comprising:
   a driver that performs drive control of a resonant circuit; and
   a signal output unit comprising:
      (i) an input node to which a resonance signal from the resonant circuit is input,
      (ii) an output node that outputs an output signal that is based on the resonance signal, and
      (iii) a switch element provided between the input node and the output node, the switch element being directly connected to both the input node and the output node,
   wherein the signal output unit is a modulation unit that modulates the resonance signal of the resonant circuit based on transmission data, and outputs a modulated signal as the output signal, and
   wherein the driver controls at least one of a first drive current in an ON period of the switch element and a second drive current in an OFF period of the switch element.

2. The circuit device according to claim 1, wherein
   the ON period is a period in which the transmission data is at a first logic level, and
   the OFF period is a period in which the transmission data is at a second logic level.

3. The circuit device according to claim 1,
   wherein the driver controls the drive current of the resonant circuit, such that a current value of the second drive current is small compared with the current value of the first drive current.

4. The circuit device according to claim 1,
   wherein the driver, in a start period of the ON period, performs control that increases a current value of the first drive current, compared with a period of the ON period other than the start period.

5. The circuit device according to claim 1,
   wherein the driver, in a start period of the OFF period, performs control that decreases a current value of the second drive current, compared with a period of the OFF period other than the start period.

6. The circuit device according to claim 5,
   wherein the driver, in the start period of the OFF period, performs control that turns off the second drive current.

7. The circuit device according to claim 1,
   wherein the driver, in the ON period, outputs a plurality of first current pulses as the first drive current, and, in the OFF period, outputs a plurality of second current pulses as the second drive current, and
   the driver controls a current value of at least one of the first current pulse and the second current pulse.

8. The circuit device according to claim 7,
   wherein the driver includes:
   a current source; and
   a transistor that is supplied with a current from the current source and controlled by a drive timing signal, and
   the driver outputs the first current pulse and the second current pulse, using the current source and the transistor.

9. The circuit device according to claim 3, further comprising:
   a storage that stores a setting value of the current value.

10. The circuit device according to claim 1, further comprising:
    a reference voltage generator,
    wherein the resonant circuit has a primary coil and a secondary coil,
    the reference voltage generator outputs a reference voltage of a primary side resonance signal to one end of the primary coil, and
    the driver outputs the drive current to the other end of the primary coil.

11. The circuit device according to claim 10, further comprising:
    a rectifier circuit that generates a rectification signal for a power supply voltage of the switch element from the resonance signal, which is a signal obtained by boosting the primary side resonance signal, using the primary coil and the secondary coil of the resonant circuit.

12. The circuit device according to claim 11,
    wherein the switch element operates based on a switching signal from a controller and a signal obtained by level shifting the rectification signal from the rectifier circuit to a signal that is based on a low potential side power supply voltage.

13. An electronic device comprising the circuit device according to claim 1.

* * * * *